Nov. 15, 1966     W. W. GREUTMAN ETAL     3,286,026
TELEVISION BANDWIDTH REDUCTION SYSTEM
Filed Oct. 24, 1963     9 Sheets-Sheet 4
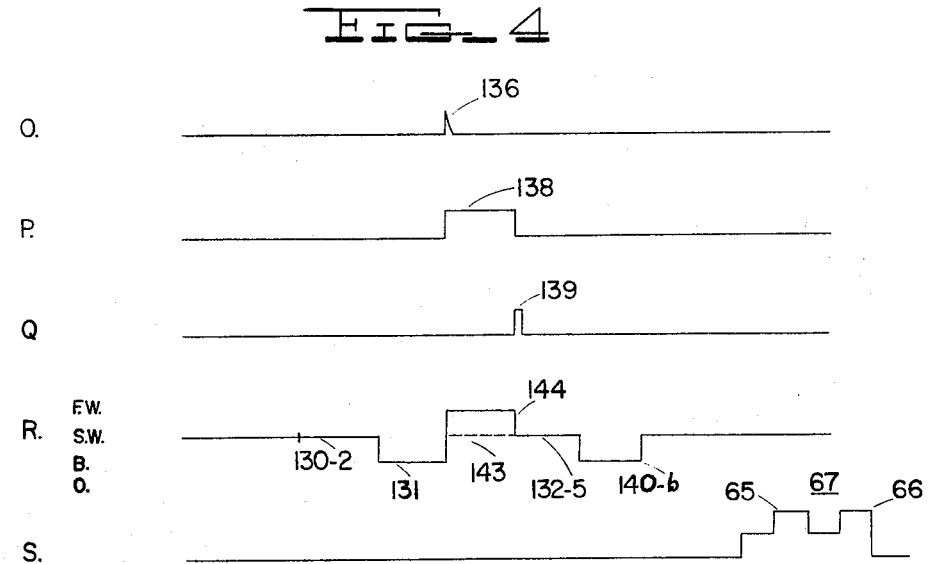
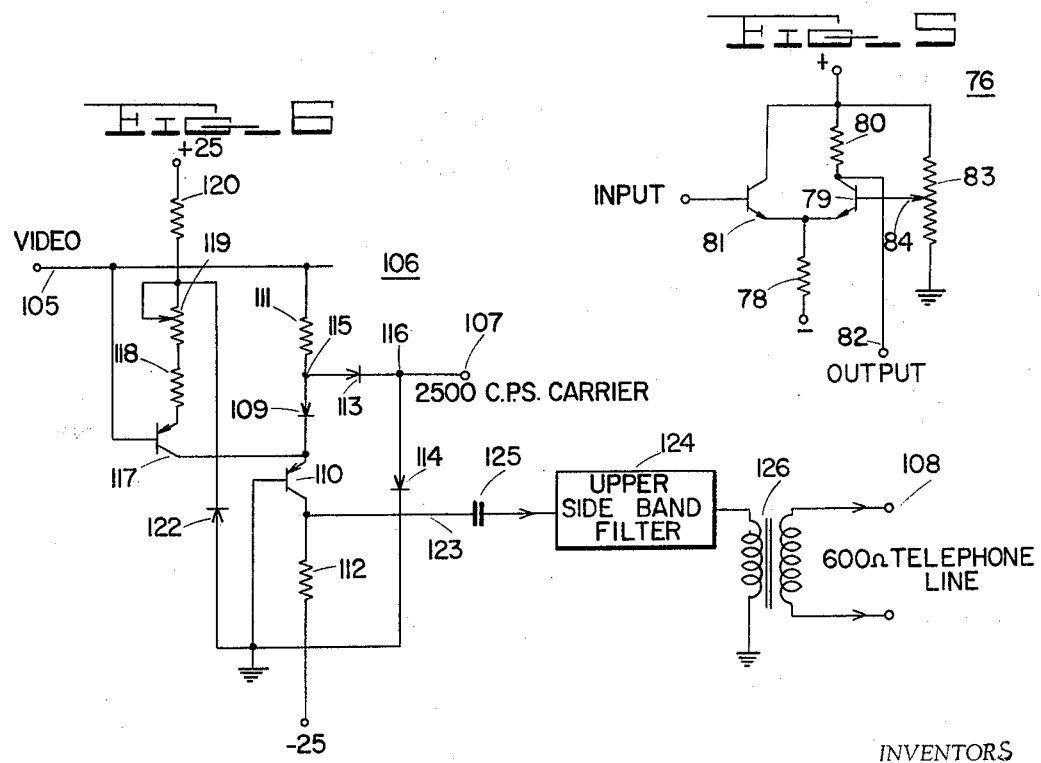
INVENTORS
WELDON W. GREUTMAN
NELSON E. HOAG
BY Hood, Gust & Irish
ATTORNEYS Nov. 15, 1966 W. W. GREUTMAN ET AL 3,286,026
TELEVISION BANDWIDTH REDUCTION SYSTEM
Filed Oct. 24, 1963 9 Sheets-Sheet 5

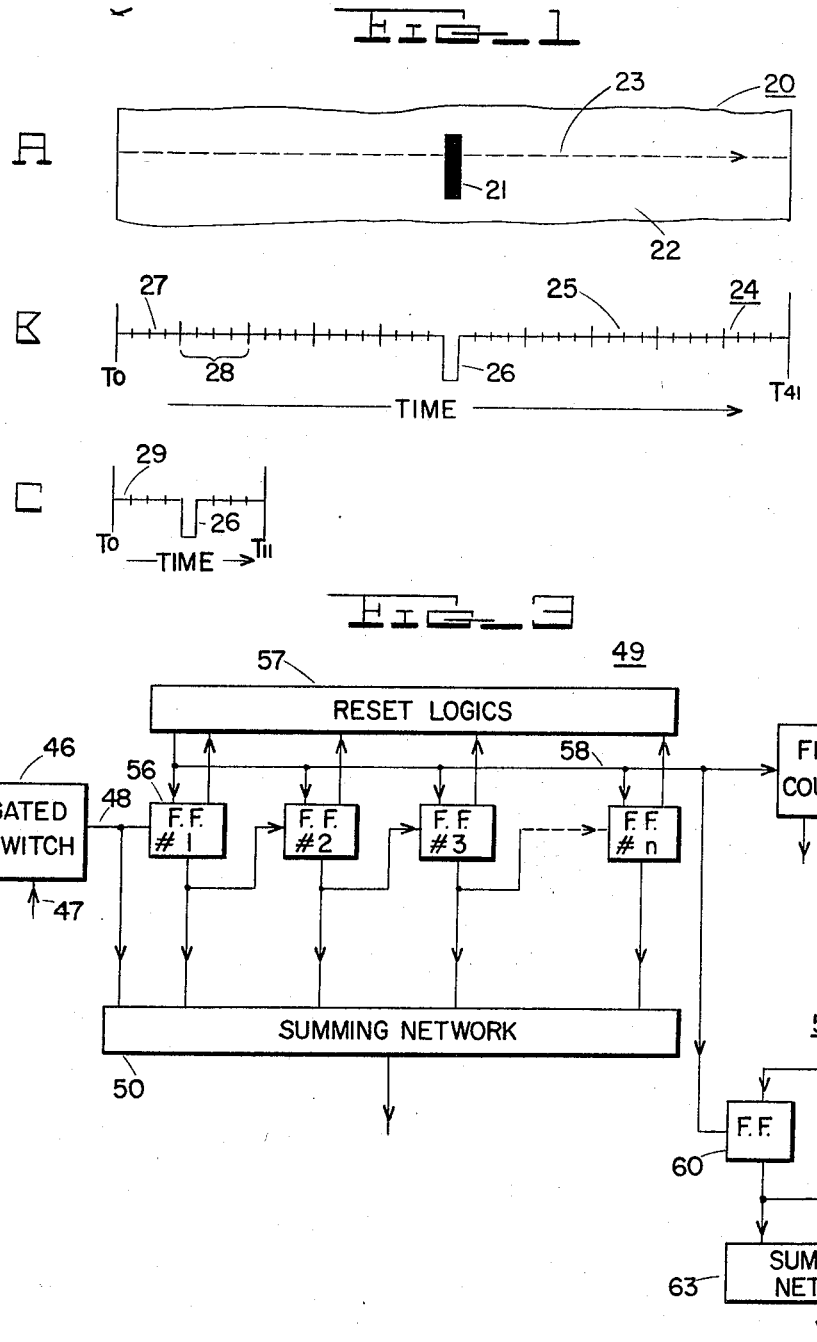

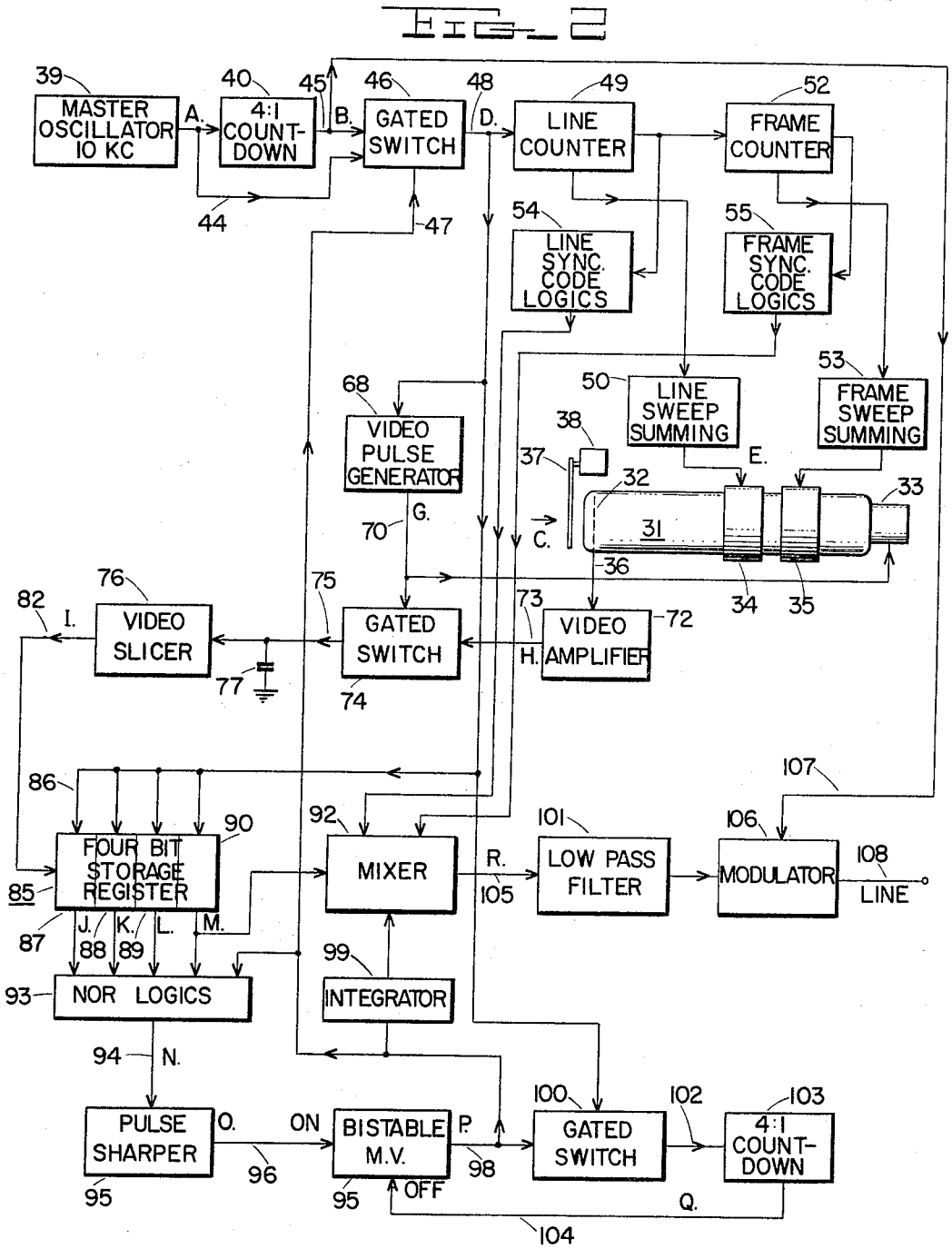

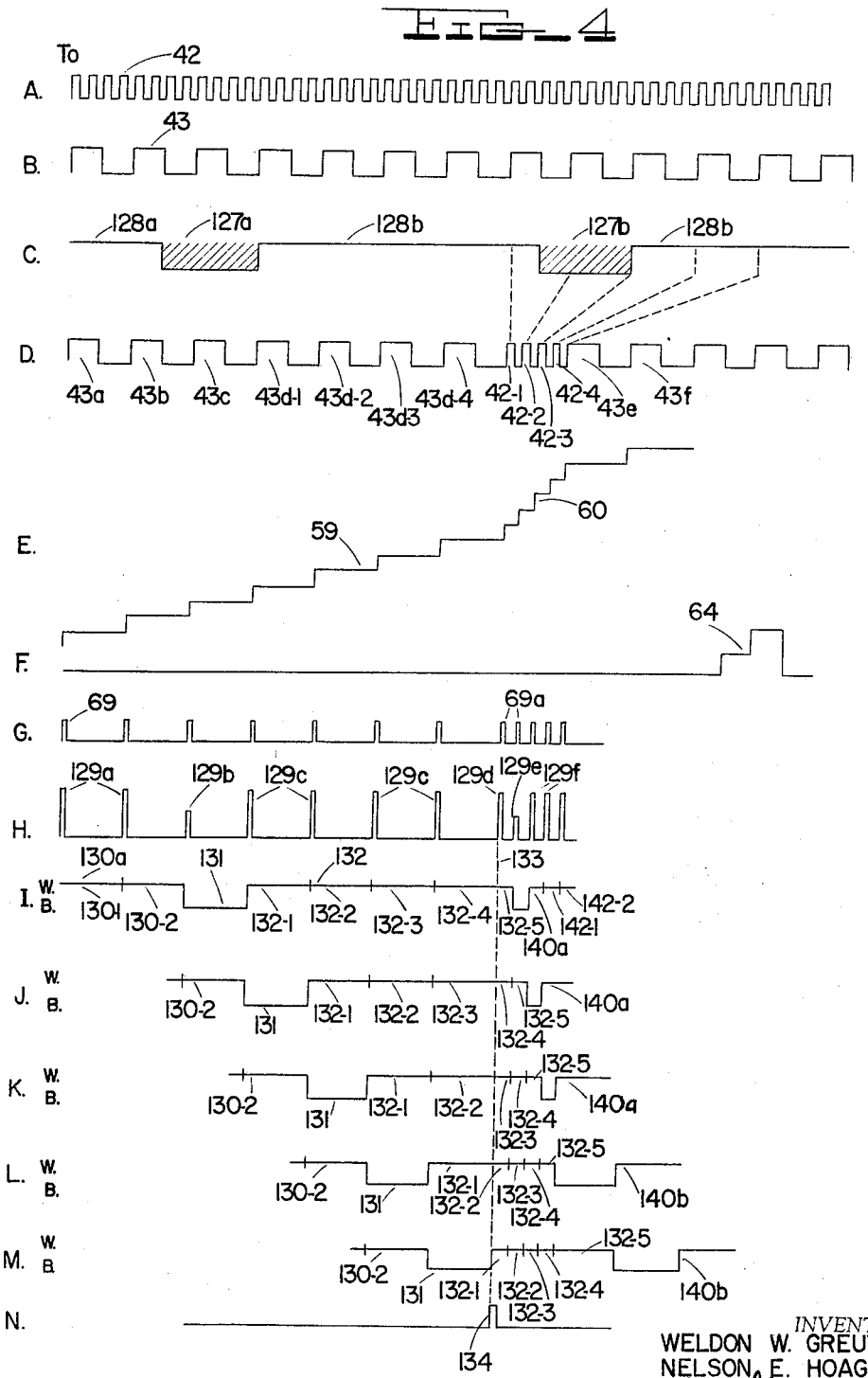

INVENTORS
WELDON W. GREUTMAN
NELSON E. HOAG
BY Hood, Gust & Irish
ATTORNEYS

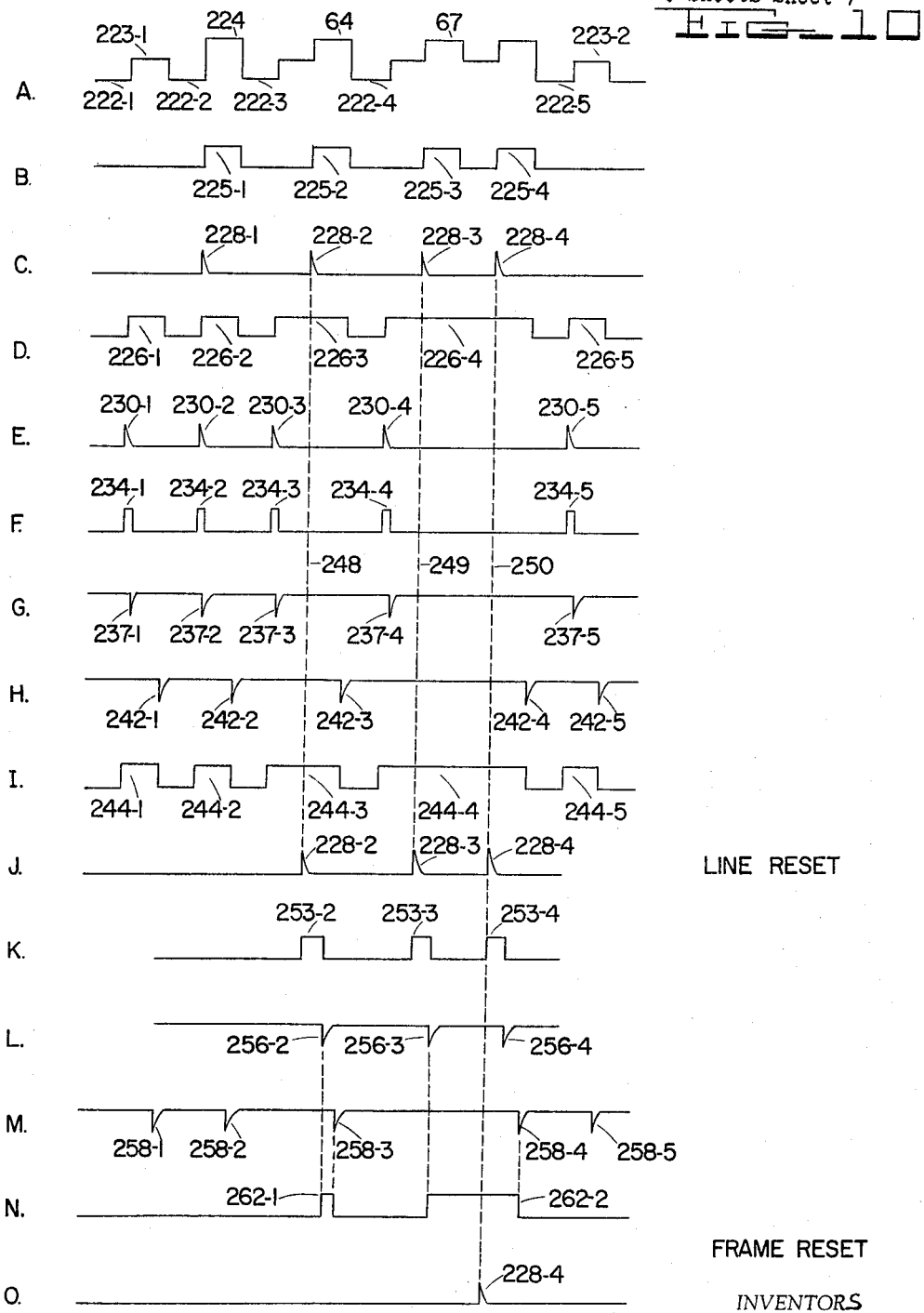

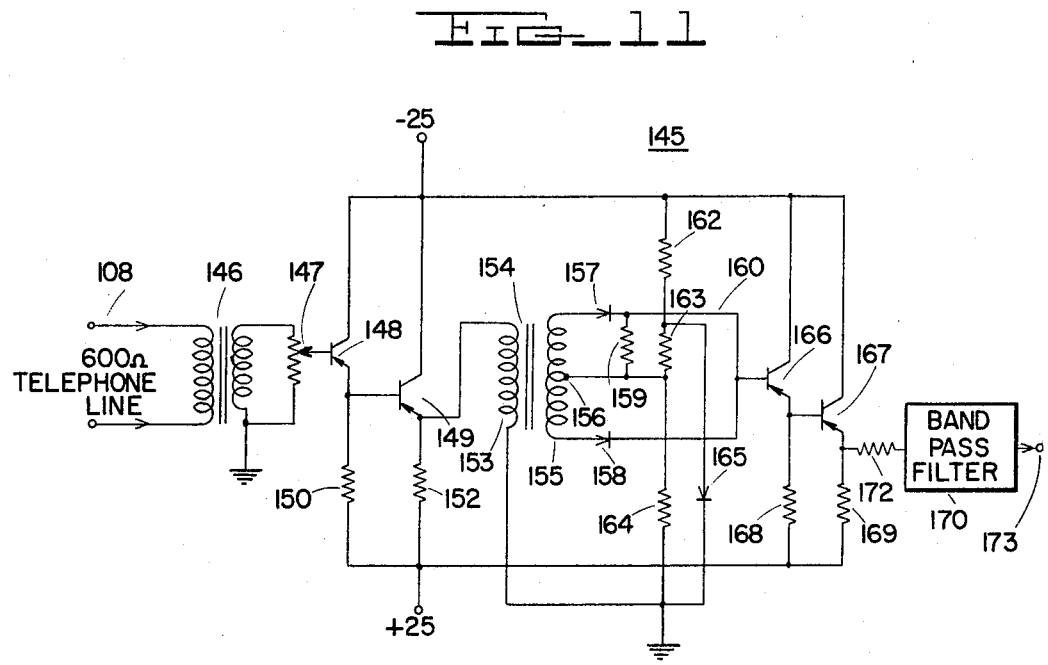

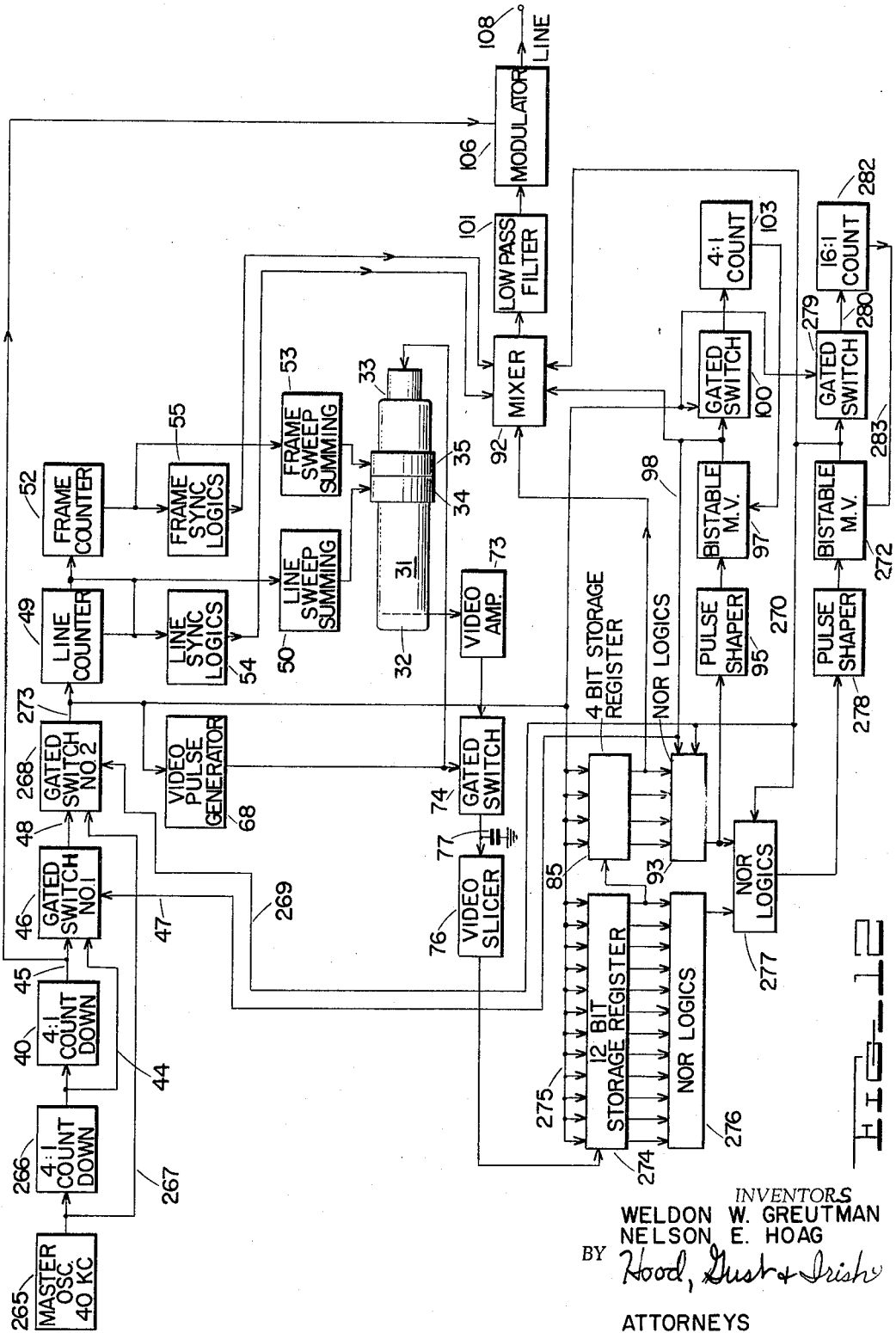

United States Patent Office 3,286,026
Patented Nov. 15, 1966

3,286,026
TELEVISION BANDWIDTH REDUCTION SYSTEM
Weldon W. Greutman, Hicksville, Ohio, and Nelson E. Hoag, Fort Wayne, Ind., assignors to International Telephone and Telegraph Corporation, Nutley, N.J., a corporation of Maryland
Filed Oct. 24, 1963, Ser. No. 318,682
22 Claims. (Cl. 178—6.8)

This invention relates to a television system and method, and more particularly to a television system and method for transmitting two color still images over a narrow band transmission facility, such as a telephone line.

Conventional television systems, by virtue of their fast scanning rates which are required in order to transmit moving images with high resolution, require an extremely wide-band transmission facility. There are numerous instances, however, where it is not necessary to transmit either a moving or half-tone image, but on the contrary where it is only desired rapidly to transmit a two color still image, such as a written or printed document. It is further highly desirable that a television system for the transmission of such two color still images be capable of operation over ordinary voice band telephone lines, even at great distances.

Conventional closed circuit television systems have been employed for the transmission of still pictures, however, as indicated, a wide-band transmission facility such as coaxial cable or a microwave link has been required. Conventional facsimile systems have also been employed for the transmission of two color still images, however, in such systems the transmission of a single picture requires appreciable time, i.e., ordinarily from 3 to 10 mintues.

Television systems and methods employing slow scanning rates have been proposed for transmitting still pictures over narrow-band facilities such as that described and illustrated in application Serial No. 246,103 filed December 20, 1962, of Nelson E. Hoag, assigned to the assignee of the present application; that system, which has the capability of transmitting half-tone images, requires a time of from 10 to 40 seconds for the transmission of one frame, depending upon the resolution desired. As indicated, however, there are instances in which it is not necessary to provide the capability of transmitting half-tone images, and further, it is desirable to provide as fast a transmission time as possible consistent with the requirement for transmission over a narrow-band facility.

Most printed and written documents, such as an ordinary typewritten page, include a substantial amount of redundant information, i.g., the background or "white" color upon which the contrasting or "black" intelligence information appears. In accordance with the invention, transmission time is accelerated in essence by compressing the redundant information; the information in the frame is compressed into less than the normal transmission time by the elimination of some amount of the redundancy. Thus, in accordance with its broader aspects, camera tube means is provided having means for converting an optical image into a corresponding electrical characteristic pattern and scanning means for converting the pattern into a time-based video signal, and sweep generating means are provided for selectively actuating the scanning means at relatively slow and fast rates, respectively. Means are provided for sensing the presence of a predetermined amount of redundant information in the image and for providing a control signal in response thereto, and means are provided coupling the sensing means to the sweep generating means for actuating the same to provide the fast scanning rate in response to the control signal. Means are provided for modifying the video signal in response to the control signal and for transmitting the video signal to a remote location. Means are provided for receiving the video signal and for detecting the modified video signal to provide another control signal in response thereto. Signal-to-image converting means are provided including another scanning means for converting the received video signal into an optical image. Other sweep generating means are provided for selectively actuating the scanning means of the signal-to-image converting means at the slow and fast rates, respectively, and means are provided coupling the detecting means to the other sweep generating means for actuating the same to provide the fast scanning rate in response to the other control signal.

In accordance with the method of the invention in its broader aspects, an optical image is converted into a corresponding electrical characteristic pattern, an electron beam is generated, and the beam is deflected at a first scanning rate to generate the time-based video signal. The presence of a predetermined amount of redundant information in the optical image is then sensed and the scanning rate of the beam deflection is increased to a second higher rate in response thereto. The video signal is transmitted to a remote location, received thereat, and applied to signal-to-image converting means. The converting means is deflected at a scanning rate corresponding to the first scanning rate to convert the video signal into an optical image, and the scanning rate of the converting means is increased to a higher rate corresponding to the second rate in response thereto.

It is accordingly an object of the invention to provide an improved television system having a faster transmission time than prior systems.

Another object of the invention is to provide an improved television system for transmitting images over a narrow-band transmission facility.

A further object of the invention is to provide an improved television system for transmitting two color still images.

Yet another object of the invention is to provide an improved television system for transmitting two color still images over a narrow-band transmission facility with a transmission time faster than that provided by prior systems.

A still further object of the invention is to provide an improved method of television transmission having faster transmission times than prior methods.

A further object of the invention is to provide an improved method of television transmission for transmitting two color still images.

A still further object of the invention is to provide an improved method of television transmission for transmitting images over a narrow-band transmission facility.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a diagram useful in explaining the fundamental mode of operation of the invention;

FIG. 2 is a schematic diagram generally showing the system of the transmitting station;

FIG. 3 is a diagram schematically showing the line counter, line sweep summing, and line synchronizing code logics of the system of FIG. 2 in greater detail;

FIG. 4 is a diagram showing the wave forms employed in the transmitting station of the system;

FIG. 5 is a schematic illustration of the video signal slicing circuit employed in both the transmitting and receiving stations;

FIG. 6 is a schematic illustration of the modulator employed in the transmitting station;

FIG. 10 is a diagram showing the wave forms employed in the circuit of FIG. 8;

FIG. 11 is a diagram schematically illustrating the demodulator circuitry of the receiving station; and FIG. 12 is a schematic diagram generally showing a modified form of the transmitting station of the invention.

Figure 7:
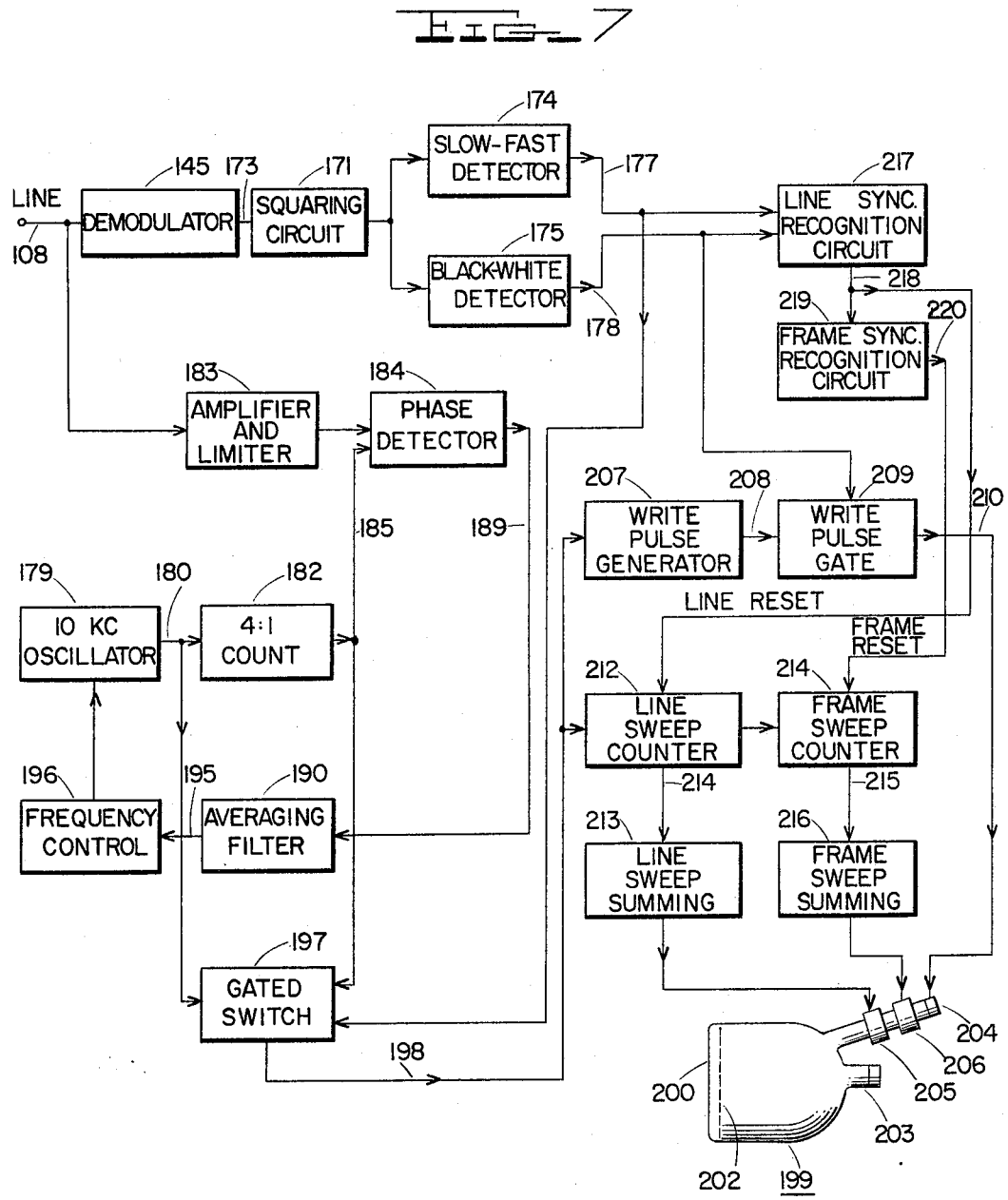
FIG. 7 is a schematic diagram generally illustrating the system of the receiving station.

Referring now to FIG. 1A, there is shown a portion 20 of a black and white image exposed to a camera tube, the image 20 comprising a "black" character 21 appearing on a "white" background 22. The image 20 is rectilinearly scanned to provide a time-based video signal, as well known to those skilled in the art, a single scanning line being shown by the dashed line 23.

FIG. 1B shows the time-based video signal 24 provided as a result of the scanning of one line of the image 20, it being assumed that the background color 22 provides a "white"-positive signal 25 and that the contrasting color information 21 provides a "black"-negative signal 26. It will readily be seen that the "white" signal 25 responsive to the background color 22 in the image 20 is present for a period of time far in excess of the duration of the "black" signal 26 which conveys the useful intelligence, i.e., the white signal 25 is conveying redundant information prior to and after occurrence of the "black" signal 26; this redundancy is clearly indicated by arbitrarily subdividing the "white" signal 25 into a plurality of relatively short increments or bits 27, it being seen that each "white" signal bit 27 conveys the same information as the preceding and succeeding "white" signal bits.

Conventional television systems of both the fast and slow scanning rate varieties have employed uniform scanning rates, both line and frame. Inspection of FIG. 1B suggests that if the redundant "white" signal information could be compressed at the transmitting station and correspondingly stretched at the receiving station, the time required for transmission of the thus compressed signal could be substantially decreased. Thus, the redundant "white" signal bits 27 in the video signal may be arbitrarily divided into groups 28, shown here as being formed of four individual signal bits 27, and a single "white" signal bit 29 transmitted indicating the successive occurrence of four individual "white" signal bits 27, as shown in FIG. 1C. Thus, with each "fast white" signal bit 29 indicating the occurrence of four "slow white" signal bits 27, it will be seen that the time required for transmission of the redundant "white" signal information is substantially reduced.

This time compression and subsequent expansion of the "white" video signal is accomplished in accordance with the invention by sensing the successive occurrence of the predetermined number of "white" signal bits 27 making up a group 28, increasing the scanning rate of the camera tube in response thereto and transmitting a single coded signal bit 29 in response to each thus-sensed group 28 of "white" signal bits. Upon the occurrence of a "black" signal 26, the scanning rate is decreased to a slower rate and the "black" signal is transmitted at the slower rate. At the receiving station, the coded fast signal bits 29 are detected and the scanning rate of the display tube correspondingly increased in response thereto, occurrence of the "black" signal 26 being detected and the scanning rate of the display tube being correspondingly reduced in response thereto.

Turning now to FIG. 2, a suitable camera or image tube 31 is provided, which may be a vidicon tube, such as the WL-7290 or which may be any other conventional camera tube including an image orthicon, image dissector tube, or flying spot scanner, as is well known to those skilled in the art. Image tube 31, which is shown as being of the vidicon type, comprises a target electrode 32 which converts an optical image exposed thereto, as shown by the arrow C into a corresponding electrical characteristic pattern. A conventional electron gun 33 generates an electron beam and directs the same toward the target electrode 32, the beam being rectilinearly deflected in well known fashion by means of horizontal and vertical deflection coils 34, 35 rectilinearly to scan the beam over the target electrode 32 and thereby to generate a time-based video signal in the output circuit 36 responsive to the electrical characteristic pattern on the target electrode 32. A mechanical shutter 37 is normally disposed in front of the target electrode 32 in order to prevent exposure of the target to light so that the target is normally dark. When it is desired to transmit a picture, shutter 37 is actuated by a solenoid 38 to expose the target 32 to the image C for a predetermined period, thus storing the image on the target. Following exposure of the image C to the target 32, the image can be scanned-off and the resulting video signal transmitted, as will be hereinafter more full described. A vidicon-type camera tube, such as a WL-7290, is desirably employed by virtue of the storage capabilities of its target electrode which permits scanning-off of the stored image with the slow scan parameters employed in the system. The system for automatically initiating transmission of a picture as described and illustrated in the aforesaid application Serial No. 246,103 may be employed in conjunction with the present system.

In order to provide the slow and fast scanning rates for the camera tube 31, the arrangement now to be described is provided. A master oscillator 39 is provided, which may be any conventional pulse generator, and which in the illustrated embodiment, continuously generates a train of pulses having a 10 kc. repetition rate. Master oscillator 39 is coupled to a conventional dividing or count-down circuit 40, which may take the form of a conventional pulse counting chain formed of conventional bi-stable multivibrators. In the illustrated embodiment which provides a compression ratio of 4 to 1, the count-down circuit 40 provides a 4 to 1 count-down of the 10 kc. pulses provided by the master oscillator 39 continuously to provide 2.5 kc. pulses. The 10 kc. pulses provided by the master oscillator 39 are employed for timing the fast scanning rate of the camera tube 31 and the 2.5 kc. pulses provided by the count-down circuit 40 are for providing the slow scanning rate; the fast timing pulses are shown at 42 in FIG. 4A and the slow timing pulses are shown at 43 in FIG. 4B.

Output circuit 44 of master oscillator 39 and output circuit 45 of count-down circuit 40 are both connected to a conventional gated switch 46 which has a gate signal input circuit 47. Gated switch 46 selectively gates either the fast timing pulses 42 or the slow timing pulses 43 to its output circuit 48 in response to the presence or absence of a control or gating signal in the gating signal input circuit 47. Output circuit of the gated switch 46 is coupled to line counter 49 which is in turn coupled to line sweep summing circuit 50. Line sweep summing circuit 50 is coupled to the line deflection yoke 34 of camera tube 31 and provides the line sweep voltage thereto determined and timed by the line counter 49, as will hereinafter be more fully described. Line counter 49 is also coupled to frame counter 52 which in turn is coupled to frame sweep summing circuit 53. Frame sweep summing circuit 53 is coupled to the frame deflection yoke 35 of camera tube 31 providing the frame sweep voltage thereto determined and timed by frame counter 52. Line counter 49 and frame counter 52 are also respectively coupled to line and frame synchronizing code logic circuits 54 and 55 for respectively providing line and frame synchronizing code signals, as will be hereinafter described.

Referring now additionally to FIG. 3, line counter 49 may comprise a plurality of 1 through n conventional bistable multivibrator of flip-flop circuits coupled in a conventional counting chain for counting-down the timing pulses 42 or 43, as the case may be, in the output circuit 48 of the gated switch 46; the output circuit 48 and each of the flip-flop circuits 56 is coupled to the line sweep summing network 50, which may be a conventional adding circuit, so that each successive pulse counted by the counting chain is added to provide a stepped line sweep voltage as shown in FIG. 4E. The flip-flop circuits 56 comprising the counting chain are also coupled to a reset logic circuit 57 for generating a resetting pulse in resetting circuit 58 in response to a predetermined pulse count. Resetting circuit 58 is likewise coupled to each of the flip-flop circuits 56 thereby simultaneously to reset the same to initiate a new pulse counting operation and thus a new line sweep. In a specific embodiment of this invention, a total of nine flip-flop circuits 56 are provided in the counting chain of line counter 49 thereby to provide a line sweep voltage having 512 steps. It will be readily seen that the duration of each line sweep voltage step depends upon whether the fast timing pulses 42 or the slow timing pulses 43 are being passed by the gated switch 46 and counted by the line counter 49. Thus, as shown in FIG. 4E, line sweep voltage steps 59, having a duration corresponding to one cycle of the slow timing pulses 43, are provided when the slow pulses are being counted, and line sweep voltage steps 60 having a duration corresponding to one cycle of fast timing pulses 42 are provided when the fast pulses are being counted. It will be observed, however, that each successive line sweep voltage step 59 or 60, as the case may be, is increased over the preceding step by the same voltage increment, and thus the electron beam provided by the electron gun 33 will be deflected the same incremental amount in response to each line sweep voltage step, whether it be a slow sweep voltage step 59 or a fast sweep voltage step 60.

Reset circuit 58 of the line counter 49 is also coupled to the frame counter 52 which may take the same form as the line counter 49, i.e., a plurality of flip-flop circuits coupled in a counting chain and in turn coupled to frame sweep summing network 53 thereby to provide a stepped frame sweep voltage. In the above-referred to specific embodiment of the invention, frame counter 52 comprises nine flip-flop circuits thereby providing a frame sweep voltage having 512 steps for a one-to-one aspect ratio.

Reset circuit 58 of line counter 49 is also coupled to the line synchronizing code logic circuit 54 which comprises a pair of conventional flip-flop circuits 60 and 62 respectively coupled to summing network 63 thereby to provide a two-stepped line synchronizing signal 64 in response to each resetting pulse provided by the reset logic circuit 57, as shown in FIG. 4F. The reset circuit of frame counter 52 is likewise coupled to frame synchronizing code logic circuit 55 which may comprise two circuits identical to the line synchronizing code logic circuit 54 for generating two successive two-stepped pulses 65 and 66 forming the frame synchronizing signal 67 as shown in FIG. 4S as will be hereinafter more fully described.

Output circuit 48 of the gated switch 46 is coupled to a conventional narrow-pulse generator 68 which generates narrow-pulses 69 in its output circuit 70 respectively in response to the fast or slow timing pulses 42 or 43 passed by the gated switch 46, whichever the case may be, as shown in FIG. 4G. Output circuit 70 of pulse generator 68 is coupled to the electron gun 33 of camera tube 31 pulsing the electron beam on and off in response to the narrow-pulses 69; pulsing of the vidicon beam where slow scanning rates are involved is desirable in order to provide a higher signal to noise ratio resulting in apparent greater resolution.

Output circuit 36 of camera tube 31 is coupled to a conventional video amplifier 72 which in turn has its output circuit 73 coupled to any conventional gated switch 74. Output circuit 70 of the pulse generator 68 is coupled to the gate signal input circuit of the gated switch 74 and thus, the narrow pulses 69 (FIG. 4) from the pulse generator 68 actuate gated switch 74 to gate the video pulses from video amplifier 72 to the output circuit 75 of gated switch 74.

Output circuit 75 of gated switch 74 is coupled to video slicer circuit 76 by integrating circuit 77. While the system is primarily intended for the transmission of images substantially comprising two contrasting colors, such as characters printed upon a background color, variations in ink, impression, and reflectivity of the paper may provide variations in the "black" and "white" levels of the video signal. Video slicer 76 serves to convert or clamp the variable "black" and "white" video signal levels to two fixed levels respectively. Referring momentarily to FIG. 5, video slicer 76 may take the form of a differential amplifier comprising a transistor 81 having its base connected to the integrating circuit 77, its collector connected to a suitable source of positive potential, and its emitter connected to a suitable source of a negative potential by a resistor 78. Another transistor 79 has its emitter connected to the emitter of transistor 77, its collector connected to the positive source of potential by resistor 80 and to its output circuit 82. Potentiometer 83 is connected between the source of positive potential and ground and has its adjustable element 84 connected to the base of transistor 79. Depending upon the setting of adjustable element 84 of potentiometer 83, transistor 81 will not be turned on in response to input signals below a predetermined level and thus, in the absence of an input signal at or above the predetermined level, transistor 79 will be conducting and the potential of the output circuit 82 essentially will be at a potential depending upon the setting of potentiometer 83. Upon the occurrence of an input signal having a level at or above a predetermined level as determined by the setting of the adjustable element 84 of potentiometer 83, transistor 81 will be conductive and transistor 79 will be turned off, thus establishing the potential of output circuit 82 at the potential of the positive source. Thus, in the illustrated embodiment of the system of the invention in which "black"-negative and "white"-positive levels are employed, a "black" video signal from the camera tube 31, regardless of its level, will result in the output circuit 82 of video slicer 76 being at ground potential while a "white" video signal, regardless of its level, will result in a "white" output video signal in output circuit 82 having a predetermined fixed level.

Output circuit 82 of video slicer 76 is coupled to the signal input circuit of a conventional storage shift register circuit 85 having a bit storage capability corresponding to the desired compression ratio. Thus, in the illustrated embodiment in which the compression ratio is 4 to 1 with the count-down circuit 40 which provides the slow pulses 43 providing a 4 to 1 count-down, storage shift register 85 is provided with a four bit storage capability. Output circuit 48 of the gated switch 46 is coupled to the shift pulse input circuits 86 of shift register 85 thus supplying the fast or slow pulses 42 or 43, as the case may be, to the storage register 85 as shift pulses. It will now be readily seen that the video signal bits provided as a result of the first one of a group of timing pulses 42 or 43 is shifted into the first register section 87 by the same first timing pulse. The second one of the succession of timing pulses shifts the first video signal bit into the second shift register section 88 and the second video signal bit into the first shift register section 87. In this fashion each successive video signal bit provided in response to a slow or fast timing pulse 42 or 43, as the case may be, is shifted successively to the shift register sections 87, 88, 89, 90 and finally out of the last register section 90 into mixer circuit 92, as will be hereinafter more fully described. It will be observed, however, that there is a delay equal in duration to four of the slow or fast timing pulses 43, 42 introduced by the shift register circuit 85 between the occurrence of a video signal bit from the camera tube 31 and the shifting of that bit to the mixer 92.

Each of the sections 87, 88, 89 and 90 of the storage shift register circuit 85 is coupled to a conventional NOR logic circuit 93 which senses the simultaneous presence in the shift register circuit 85 of four "white" level signal bits provides a signal in its output circuit 94 in response thereto. Output circuit 94 of the logic circuit 93 is coupled to a conventional pulse shaping or differentiating circuit 95 which differentiates the leading edge of the signal provided by the logic circuit 93 to provide a sharp pulse in its output circuit 96. Output circuit 96 of the pulse shaper 95 is coupled to the "ON" input circuit of conventional bistable multivibrator 97. Thus, impression of the pulse from the pulse shaper 95 in response to the sensing of the simultaneous presence of four "white" video signal bits in shift register 87 will turn "ON" the multivibrator 97 to initiate a control pulse in output circuit 98 of the multivibrator 97. Output circuit 98 of the bistable multivibrator 97 is coupled to the gating signal input circuit 47 of the gated switch 46 and thus, the control pulse provided by the multivibrator 97 in response to sensing by the logic circuit 93 of the simultaneous presence of four "white" video signal bits in the shift register 85 actuates gated switch 46 to gate the fast timing or clock pulses 42 to its output circuit 48 and in turn to the line and frame counters 49, 52, and to the video pulse generator 68. Output circuit 98 of the bistable multivibrator 97 is also coupled to the logic circuit 93 so that the control pulse inhibits or disables the logic circuit 93. Output circuit 98 of multivibrator 97 is also coupled to mixer circuit 92 by a suitable integrating circuit 99 as will be hereinafter more fully described.

Output circuit 98 of the bistable multivibrator 97 is further coupled to the gating signal input circuit of gated switch 100 to which output circuit 48 of gated switch 46 is also coupled. The output circuit 102 of gated switch 100 is coupled to another dividing or pulse count-down circuit 103 which provides the same pulse count-down as the count-down circuit 40, i.e., 4 to 1 in the illustrated embodiment. The output circuit 104 of the count-down circuit 103 is coupled to the "OFF" input circuit of the bistable multivibrator 97.

Recalling that the control pulse initiated by the multivibrator 97 in response to the simultaneous occurrence of four "white" video signal bits in the shift register 85 actuated the gated switch 46 to gate the fast timing pulses 42 to its output circuit 48, the control pulse in the output circuit 98 of multivibrator 97 also is employed to actuate gated switch 100 to pass the fast clock pulses 42 to the count-down circuit 103. Thus, the fourth fast pulse 42 gated through the gated switch 46 following its actuation by the control pulse from the bistable multivibrator 97, as counted by the count-down circuit 103, is applied to the bistable multivibrator 97 to turn off the same and thus to terminate the control pulse. However, it will be further observed that during the duration of the control pulse, i.e., during four of the fast pulses 42, the fast pulses are impressed on the shift circuits 86 of the shift register 85 thus to shift out the four "white" video signal bits into the mixer circuit 92; while the term "signal bits" has been employed and while each of the shift register sections 87, 88, 89 and 90 has a "white" video signal level stored therein, it will be observed that these "white" video signal bits are shifted out of the shift register 85 and into the mixer 92 at the fast rate established by the fast timing pulses 42 as a single "white" level signal. Thus, initially, four video signal bits resulting from four slow timing pulses 43 scanned off of the target electrode 32 of the camera tube 31 at the slow scanning rate determined by the slow timing pulses are shifted into the shift register 85. When the first four video signal bits have thus been shifted into the shift register 85 at the slow rate, if all of these video signal bits are "white" level bits, that fact is sensed by the logic circuit 93 causing multivibrator 97 to initiate the control pulse. The control pulse in turn actuates switch 46 to pass the fast timing pulses 42 thereby changing from the slow to the fast scanning rate and shifting the four stored "white" level pulses out of the shift register 85 to the mixer 92 at the fast rate and at the same time shifting four new video signal bits into the shift register 85; the logic circuit 93 which performs the sensing operation is disabled while the four "white" signal bits are shifted out of the shift register 85 at the fast rate and the four new signal bits are shifted into the shift register. At the end of this four fast timing pulse interval, the control pulse is terminated thereby again enabling the logic circuit 93. If at that instant, the four video signal bits which have been shifting into the shift register 85 at the fast rate are also all of the "white" level, a new control pulse is immediately initiated and the above-described sequence of operation is repeated. Thus, as long as successive groups of four "white" level video signal bits continue to appear simultaneously in the shift register 85, the fast timing pulses 42 will be passed by the gated switch 46. However, if following the above described shifting of the four "white" level video signal bits out of the shift register 85 at the fast rate and the shifting into the shift register of four new video signal bits in succession, one or more of the next four video signal bits which have been shifted into the shift register 85 at the fast rate should be a "black" signal level bit, no new control pulse will be initiated, the gated switch 47 will thus remain deactuated following termination of the first control pulse, and slow timing pulses 43 will be passed by the gated switch 46 thus to provide the slow scanning rate in the camera tube 31. The slow shift pulses are thus impressed on the shift register 85 thereby to shift the group of four video signal bits which includes at least one "black" signal bit out of the shift register 85 to the mixer 92 at the slow rate, the next four video signal bits being simultaneously shifted into the shift register 85 at the slow rate.

Output circuit 98 of the bistable multivibrator 97 is coupled to mixer 92 by a suitable integrating circuit 99 thereby to couple the control pulses from the bistable multivibrator 97 to the mixer. Mixer 92 may be a conventional adding circuit which functions to add the control pulse to the video signal impressed upon the mixer from the shift register 85. Recalling that the control pulse is provided only in response to and during the shifting of four "white" level video signal bits out of the shift register 85 to the mixer 92, the control pulse is thus added to the "white" level signal to provide a third level video signal higher than the "white" and "black" video signal levels with respect to a reference potential level, in this case, "ground." Recalling further that one control pulse is provided in response to each group of four "white" level video signal bits in a shift register 85, it will be observed that a succession of control pulses will be provided in response to a succession of groups of four "white" level video signal bits shifted into and out of the shift register 85 at the fast rate. Since this succession of "white" level video signal bits shifted into the mixer 92 at the fast rate will appear as a continuous "white" level signal, in order to provide a continuous third level signal integrating circuit 99 is provided in essence to impress a continuous control signal upon the mixer 92 in response to the occurrence of successive groups of four "white" level video signal bits in the shift register 85.

The line and frame synchronizing code logic circuits 54 and 55 are also coupled to the mixer 92 which functions to add the two-step line synchronizing pulses 64 (FIG.

4F) and the successive two-step frame synchronizing pulses 67 (FIG. 4S), respectively, to the video signal.

The output circuit 105 of mixer 92 is coupled by low pass filter 101 to the signal input circuit of a suitable modulator 106 which amplitude modulates the video signal from the mixer 92 onto a carrier signal. In the illustrated embodiment, the three level video signal, i.e., "black," "white" and "whiter than white" or "fast white" are modulated onto a square wave carrier, the slow timing pulses 43 provided by the count-down circuit 40 being employed for the carrier signal. Thus, output circuit 45 of count-down circuit 40 is coupled to the carrier input circuit 107 of modulator 106. The output circuit 108 of modulator 106 is coupled to a suitable transmission facility, such as a conventional voice band telephone line.

Referring now to FIG. 6, there is shown a circuit suitable for use as the modulator 106; this circuit is described and illustrated in the aforesaid application Serial No. 246,103 and is further described, illustrated and claimed in application Serial No. 247,186 of Nelson E. Hoag and Jerry L. Holsinger assigned to the assignee of the present application. Recalling that any "black" level video signal bits are shifted out of the shift register 85 into the mixer 92 and thus, in turn, to the modulator 106 at the slow rate determined by the slow timing pulses 43, and further that while each group of four "white" level video signal bits simultaneously appearing in the shift register 85 are shifted out of the shift register to the mixer and in turn to the modulator at the fast rate, each such group is shifted out of the shift register as a single "white" level video signal having the same duration as one "black" video signal bit, at the slow scanning rate indicated, i.e., 2.5 kc., the video signal impressed upon input circuit 105 of modulator 106 may have a frequency range from 0 to 2250 cycles, i.e., up to .9 of the carrier frequency. Coupled to the input circuit 105 of modulator 106 is a diode-resistor switching network comprising the resistor 111, diode 109, the emitter-collector circuit of transistor 110 and resistor 112 serially connected between input circuit 105 and a suitable source of negative potential such as −25 volts, the base of transistor 110 being connected to ground, as shown. Diode 113 and zener diode 114 connect point 115 between resistor 111 and diode 109 to ground. The carrier signal pulses 43 are coupled to carrier signal input circuit 107 which is connected to point 116 between diodes 113 and 114. Transistor 110 is normally conducting, and with a potential of 0 volts applied to point 116, i.e., in the absence of a negative-going carrier signal pulse 43, diode 113 will be back-biased. The video signal appearing on line 105 will thus cause current to flow in the voltage divider-switching circuit to provide a video signal at the collector of transistor 110. It will be seen that when a negative-going carrier signal pulse, e.g., on the order of −5 volts, is applied to point 116, the back-bias on diode 113 is removed and diodes 113 and 114 will conduct the video signal to ground thus back-biasing diode 109 to turn it off and, in essence, short circuiting resistor 111 so that no current will flow into transistor 110 which allows the collector of transistor 110 to reach the −25 volt potential. It will readily be seen that the result is a pulsing or chopping of the video signal on input circuit 105 at the 2.5 kc. rate.

In a narrow-band amplitude modulated transmission system of this type, it is desirable to cancel the video or modulating signal component. As is demonstrated mathematically in said application Serial No. 247,186, this may be accomplished by inverting the modulating signal and feeding it back at half-amplitude to be mixed with the modulated signal. Thus, the input circuit 105 of modulator 106 is connected to the base of transistor 117 which has its collector coupled to the emitter of transistor 110 and its emitter connected to a suitable potential, such as +25 volts by resistor 118, potentiometer 119 and resistor 120. The point between potentiometer 119 and resistor 120 is connected to ground by diode 122. In this manner, the video signal on line 105 is inverted, its amplitude reduced by one-half, and the resulting half-amplitude inverted video signal appearing at the collector of transistor 117 is applied to the emitter of transistor 110 to be mixed with the modulated signal in the voltage divider-switching network with the result that the signal appearing in line 123 connected to the collector of transistor 110 comprises the carrier and the upper and lower side band components with the modulating signal component eliminated. It will be observed that by virtue of the employment of a symmetrical square wave carrier signal, there are no second harmonics in the resulting modulated signal, only the odd harmonics being strong. Line 123 is coupled to a suitable upper side band filter 124 by a coupling capacitor 125. Upper side band filter 124 removes the upper side band component to provide a transmission signal including only the carrier and lower side band signal components, thus providing a vestigial side band system. The upper side band filter 124 is coupled to output circuit 108, which may be a conventional 600 ohm telephone line, by a suitable coupling transformer 126.

Low pass filter 101 is necessary in vestigial side band transmission in order to prevent phase distortion in the recovered video signal at the receiving station. Filter 101 should have an upper cut-off frequency no higher than the highest video frequency, i.e., 2250 cycles in the specific system herein described, and preferably somewhat lower, but greater than half the carrier frequency, i.e., 1250 cycles. In the specific example, filter 101 has a cut-off frequency of approximately 1750 cycles.

Referring now particularly to FIG. 4A through S, it will be observed that the designations A through S for the several wave forms shown are applied in the schematic diagram of FIG. 2 to indicate where these wave forms respectively appear. As indicated, FIGS. 4A and B respectively show the fast clock or timing pulses 42 provided by the master oscillator 39 and the slow clock or timing pulses 43 provided by the count-down circuit 40. Referring now to FIG. 4C, there is shown diagrammatically a representation of one scanning line on the target electrode 32 of the camera tube 31, areas 127a and 127b being of the contrasting color to provide a "black" video signal and areas 128a, 128b and 128c being the background color which provides the "white" video signal. Considering transmission of the line shown in FIG. 4C to be initiated at time $T_0$, it will be recalled that initially the slow clock pulses 43 are being passed by the gated switch 46 thus providing the slow stepped line sweep voltage 59. Thus, slow "white" level video signal pulses 129a will be gated through the gated switch 74 from the camera tube 31 in response to the trigger pulses 69 while the background color area 128a is being scanned. Likewise, the "black" video signal pulse 129b will be provided in response to scanning of the dark area 127a and a train of four "white" video signal pulses 129c will be provided in response to scanning of the background area 128b during the occurrence of four slow timing pulses, identified as 43d. The "white" video signal pulses 129a and 129c and the "black" signal pulse 129b are integrated by integrating circuit 77 to provide a "white" video signal level 130a in response to the "white" video signal pulses 129a, a "black" video signal level 131 in response to the "black" video signal pulse 129b, and a "white" video signal level 132 in response to the "white" video signal pulses 129c.

It will now be recognized that the video signal shown in FIG. 4I appearing in the output circuit 82 of video slicer 76 is initially shifted into shift register 85 by the slow timing pulses 43. Thus, "white" video signal bit 130–1 is shifted into shift register 85 by pulse 43a, bit 130–2 is shifted into the register by pulse 43b, "black" video signal bit 131 is shifted into the shift register by pulse 43c, and "white" video signal bits 132–1, 132–2, 132–3 and 132–4 are successively shifted into the shift register by the timing pulses 43d–1, 43d–2, 43d–3, and 43d–4, respectively. Recalling now that there is a one bit delay for storage provided in each of the shift register sections 87, 88, 89 and 90, the video signal bits simultaneously stored in each of the shift register sections are shown in FIG. 4J, K, L, and M. Thus, it is seen that when the "black" video signal bit 131 is shifted into shift register 85 (FIG. 4J), the preceding "white" video signal bit 130–2 appears in register section 87. Likewise, when "white" video signal bit 132–1 is shifted into the shift register, "black" video signal bit 131 appears in shift register section 87 and "white" video signal 130–2 appears in shift register section 88 (FIG. 4K). It will now be seen that when the next timing pulse following pulse 43d–4 shifts the next signal bit (in this case a "white" signal bit 132–5) into the register, "white" signal bit 132–4 will appear in shift register section 87 (FIG. 4J), "white" signal bit 132–3 will appear in register section 88 (FIG. 4K), "white" signal bit 132–2 will appear in register section 89 (FIG. 4L) and "white" signal bit 132–1 will appear in register section 90 (FIG. 4M). Thus, it is seen that four "white" video signal bits simultaneously appear in the four shift register sections, as shown by the dashed line 133 in FIG. 4, this simultaneous appearance of four "white" video signal bits being sensed by the NOR logic circuit 93 to provide signal 134 in its output circuit 94, as seen in FIG. 4N. The leading edge of signal 134 is differentiated by the pulse shaper 95 to provide pulse 136 which turns on bistable multivibrator 97 to initiate control pulse 138.

Control pulse 138 is applied to gated switch 46 to actuate the same to pass fast timing pulses 42–1, 42–2, 42–3 and 42–4 to the line and frame counters 49, 52 thereby to provide the fast stepped line sweep voltage 60 as shown in FIG. 4E. Reference to FIGS. 4C and D will show that the first fast pulse 42–1 causes the beam to scan background color area 128b, however, that the next fast pulse 42–2 causes the beam to scan the "black" color area 127b in the scanning line. The next two successive scanning pulses 42–3 and 42–4 cause the beam to scan background color area 128c. The fast timing pulses 42–1, 42–2, 42–3 and 42–4 therefore, respectively result in "white" video signal pulse 129d, "black" video signal pulse 129e and "white" video signal pulses 129f, the video signal pulses 129d, 129e, and 129f occurring at the fast rate by virtue of the fact that the fast timing pulses 42–1, 42–2, 42–3, and 42–4 are actuating the pulse generator 68 to provide fast trigger pulses 69a (FIG. 4G and H).

The control pulse 138 is impressed upon the gated switch 100 to actuate the same thereby to pass the fast timing pulses 42–1, 42–2 42–3 and 42–4 to the count-down circuit 103 with the result that upon the occurrence of the fourth fast pulse 42–4, pulse 139 appears in the output of count-down circuit 103 and is employed to turn off the bistable multivibrator 97 thereby to terminate the control pulse 138 (FIGS. 4P and Q). It will now be recalled that the slow clock pulses 43a, b, c, and d have been applied to the shift rircuit 86 of the shift register 85 by the gated switch 46 so that the "white" signal bits 130–1 and 130–2, the "black" signal bit 131 and the "white" signal bits 132–1, 132–2, 132–3, and 132–4 are shifted into the shift register by these slow pulses, the "white" signal bits 130–1 and 130–2 and the "black" signal bit 131 likewise shifted out of the shift register and into the mixer 92 by these slow timing pulses. However, when a control pulse 138 occurs in response to the simultaneous appearance of the "white" video signal bits 132–4, 132–3, 132–2 and 132–1 in the shift register section 87, 88, 89 and 90, the fast timing pulses 42–1, 42–2, 42–3 and 42–4 are applied to the shift circuit 86 of the shift register thereby to shift these four "white" video signal bits 132–1, 132–2, 132–3 and 132–4 successively out of the shift register and to the mixer 92 as one continuous "white" level signal having the same duration as one slow video signal bit, as shown in FIG. 4M. It will also be seen that as this group of four "white" video signal bits is shifted out of the shift register 85 to the mixer 92 at the fast rate, "white" video signal bit 132–5, "black" video signal bit 140a, and "white" video signal bits 142–1 and 142–2 appearing in the output circuit 82 of video slicer 76 in response to the video signal pulses 129d, 129e, and 129f are shifted into the shift register 85 at the fast rate. It will be observed, however, that by the time the "black" video signal bit 140 is shifted into register section 89, the control pulse 138 has been terminated thus causing gate 46 to again pass the slow pulses 43, so that "black" pulse 140 remains in the register section 89 for the duration of a slow pulse cycle as shown at 140b in FIG. 4L, the "black" bit 140b and the "white" signal bit 132–5, appearing in and being shifted out of the last register section 90 to the mixer 92 as slow signal bits by slow signal pulses 43e and 43f which are now applied to shift the shift register.

It will be observed that when the control pulse 138 is terminated in response to the counting by the count-down circuit 103 of the four fast timing pulses 42–1, 42–2, 42–3 and 42–4, to provide pulse 139, a "black" video signal bit appears in one of the register sections, i.e., "black" video signal bit 140b in register section 89. This being the case, the NOR logic circuit 93 does not again provide another signal 134 since there are not four "white" video signal bits simultaneously present in the register, and thus gated switch 46 is deactuated thereby to pass slow clock pulses 43.

As indicated, it will now be seen that during the occurrence of the control pulse 138, a group of four successive "white" level video signal pulses are impressed upon the mixer 92 as a single "white" level video signal and having the same duration as one slow video signal bit, shown by dashed line 143 in FIG. 4R. Control pulse 138 is impressed upon mixer 92 and thereby added to the video signal 143 to provide a third level signal 144, as shown. Following termination of control pulse 138 and thus the third level signal 144, the slow "white" video signal bit 132–5 is impressed upon the mixer 92 followed in succession by the slow "black" video signal bit 140b, all as shown in FIG. 4R. It will now be readily seen that the third level signal 144 will be initiated as above described only following a "black" level signal thus indicating the successive occurrence of four "white" level video signals. Thus, the occurrence of the third level signal 144 in the video signal applied to modulator 106 serves as a coded indication of the successive occurrence of four "white" video signal bits.

The two-stepped line synchronizing pulse 64 when added to the video signal by the mixer 92 whether a "black" video signal bit or a "white" video signal bit is then present, provides a third level signal following a "white" level signal, and likewise, the two successive two-stepped frame synchronizing pulses 65, 66 provide two third level video signal pulses respectively following "white" video signal levels. Since, as indicated, the third level "fast white" video signal level 144 indicating the occurrence of four "white" video signal bits in succession is always initiated following a "black" signal bit, the occurrence of the "fast white" third level signal following a "white" level video signal will always indicate either a line or a frame synchronizing signal.

Referring now to FIG. 7 in which the receiving station of the system of the invention is shown, transmission line 108 is coupled to demodulator 145 for recovering the video signal contained in the transmission signal. It will be recalled that in the illustrated embodiment, the frequency of the modulating signal, i.e., 0 to 1.75 kc. is close to the frequency of the carrier signal, i.e., 2.5 kc. and thus conventional demodulation techniques may not be suitable with such a small separation between the modulating signal and the carrier signal. Referring now to FIG. 11, a suitable demodulating circuit is shown for recovering a video signal having a frequency approaching that of the carrier. Here, the video signal received from line 108 is applied to the primary winding of a suitable coupling transformer 146 having a gain control potentiometer 147 connected across its secondary winding. The movable element of potentiometer 147 is connected to the base of transistor 148 which, with transistor 149, forms a double emitter follower, the collectors of both transistors being connected to a suitable source of negative potential, such as −25 volts and the emitters being respectively connected to a suitable source of positive potential, such as +25 volts by resistors 150 and 152. The emitter of transistor 149 is coupled to one side of the primary winding 153 of transformer 154, the other side being connected to ground. The secondary winding 155 is center tapped at 156 with its two ends connected together by diodes 157 and 158 to form a full-wave rectifier. Resistor 159 connects the midpoint 160 between diodes 157 and 158 to center tap 156 and a voltage divider comprising resistors 162, 163 and 164 is connected across the −25 volt source and ground with center tap 156 being connected between resistors 163 and 164. Zener diode 165 connects a point between resistors 163 and 164 to ground. Point 160 is connected to the base of transistor 166 which, with transistor 167, forms another double emitter follower, the collectors being connected to the −25 volt source and the emitters being connected to ground by resistors 168 and 169, respectively. The emitter of transistor 167 is coupled to band-pass filter 170 by resistor 172. Band-pass filter 170 passes only the modulating, i.e., the video baseband signal component of the transmitted signal, i.e., to pass frequencies from 0 to 1750 c.p.s. and to reject higher frequencies.

It will be recalled that in the modulation process, the modulating and upper side band components were cancelled with the result that the transmitted signal contains only the lower side band and carrier signal components. In the demodulation process, the effect of full-wave rectification provided by the diodes 157 and 158 is to double the frequency of the carrier, the modulating or video signal component reappearing at the output of the band-pass filter 170. The modulation and demodulation process employed in this system is more fully described in application Serial No. 802,233 filed March 26, 1959, of A. Gatfield assigned to the assignee of the present application.

Output circuit 173 of the demodulator 145 is coupled to squaring circuit 171 which in turn is coupled to slow-fast detector 174 and black-white detector 175. Slow-fast detector 174, which may be another video slicer or differential amplifier circuit of the type shown in FIG. 5 provides an output signal in its output circuit 177 in response to the third level video signal, while black-white detector 175, which likewise may be a video slicer or differential amplifier circuit of the type shown in FIG. 5, provides output signal in its output circuit 178 in response to a video signal of both the "white" and third or "fast white" levels. Thus, it is seen that another control signal is provided in the output circuit 177 of slow-fast detector 174 in response to a third level or "fast white" signal 144 which indicates the successive occurrence of four "white" video signal bits.

By virtue of band-pass filter 170, the output signal from demodulator 145 is essentially a sine wave. Squaring circuit 171, which may be a conventional high peaker circuit, squares the output signal from the demodulator so that the video slicers 174, 175 provide output signals having a duration comparable to those appearing at the output of mixer 92.

Another clock or timing pulse generator 179 is provided having the same repetition rate as the master oscillator 39 of the transmitting station of FIG. 2, e.g., 10 kc. in the illustrated embodiment. Oscillator 179 has its output circuit 180 coupled to count-down circuit 182 for providing the same pulse count-down as the count-down circuit 140 of the transmitting station dependent upon the compression ratio selected for the system, e.g., 4 to 1 in the illustrated embodiment.

Figure 9:
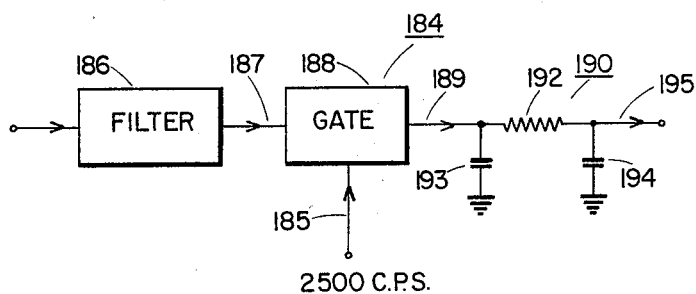
FIG. 9 is a schematic diagram further illustrating the phase detector portion of the receiving station.

The receiving oscillator 179 is synchronized with the master oscillator 39 of the transmitting station in the manner now to be described. Line 108 is coupled to a conventional amplifier and limiter circuit 183 which in turn is coupled to a phase detector 184. The count-down circuit 182 has its output circuit 185 also connected to phase detector 184. Referring additionally to FIG. 9, phase detector 184 comprises a suitable filter 186 coupled to the amplifier limiter 183 for filtering and passing only the carrier component of the transmitted signal, i.e., 2.5 kc. The output circuit 187 of filter 186 is coupled to and actuates gate 188 to which output circuit 185 of the count-down circuit 182 is connected. In this fashion, the phase of the 2.5 kc. carrier signal passed by the filter 186 is compared with the phase of the 2.5 kc. slow timing pulses provided by the count-down circuit 182 to provide a resulting error signal if there is a phase difference. Phase detector 184 has its output circuit 189 coupled to an averaging filter 190 which, as shown in FIG. 9, comprises a serially connected resistor 192 with suitable capacitors 193 and 194 connecting either end to ground. The output circuit 195 of averaging filter 190 is coupled to a conventional frequency control circuit 196, which may be a conventional reactance tube, for controlling the frequency of the receiving oscillator 179.

Output circuit 177 of the slow-fast detector 174 is coupled to the gating signal input circuit of gated switch 197 to which output circuit 180 of the receiving oscillator 179 and output circuit 185 of the count-down circuit 182 are both connected. Thus, it is seen that the occurrence of a control signal in output circuit 177 as the result of detection by the slow-fast detector 174 of a third level or "fast white" signal in the video signal will actuate gated switch 197 to pass the fast timing pulses from the oscillator 179 to output circuit 198 of the gated switch 197; in the absence of the control signal from slow-fast detector 174, gated switch passes the slow timing pulses from the count-down circuit 182.

In order to display the recovered video signal, a direct viewing cathode ray tube 199 is provided, which, by virtue of the slow scanning rates employed in the system, is desirably a storage-type tube, such as No. FW-245 manufactured by the assignee of this application, tube 199 includes a display screen 200, a storage electrode 202, a reading or flood electron gun 203, a writing electron gun 204, and vertical and horizontal deflection coils 205 and 206 for rectilinearly scanning the writing electron beam provided by writing gun 204 over the storage electron tube, as is well known to those skilled in the art.

A writing pulse generator 207 is provided coupled to the output circuit 198 of the gated switch 97 for generating narrow writing pulses in response to the fast or slow timing pulses passed by the gating switch 197, as the case may be. Writing pulse generator 207 has its output circuit 208 coupled to writing pulse gate circuit 209 which has its gating signal input circuit coupled to output circuit 178 responsive to detection by the black-white detector 175 of the "white" or "fast white" video signal, writing pulse gate circuit 209 is actuated to pass writing pulses from the writing pulse generator 207 to its output circuit 210, which in turn is coupled to writing gun 204 of the display tube 199 for pulsing the writing electron beam on and off in response to the thus gated writing pulses. Thus, whenever a "white" or "fast white" i.e., third level video signal occurs, the writing beam is pulsed on and off by the writing pulses respectively in response to the fast or slow timing pulses, thereby to store "white" signal information on the storage electrode within the tube, which may be displayed on the display screen 200 by flooding the storage electrode 202 with the flood electron beam from the flood gun 203, as is well known to those skilled in the art.

In order to provide for scanning of the writing electron beam in coincidence with scanning of the electron beam in the camera tube 31, line sweep counter 212 is provided coupled to the output circuit 198 of the gated switch 197 with line sweep summing circuit 213 coupled to its output circuit 214 and in turn coupled to horizontal deflection yoke 205. The circuitry of the line sweep counter 212 and the line sweep summing circuit 213 may be identical to that provided for the line counter 49 and line sweep summing circuit 50 of the transmitting station, as above described. Frame sweep counter 214 is in turn coupled to line sweep counter 212 and has its output circuit 215 coupled to frame sweep summing circuit 216, which in turn is coupled to the vertical deflection yoke 206. Again, the circuitry of the frame sweep counter 214 and the frame sweep summing circuit 216 may be identical to that provided for the frame counter 52 and frame sweep summing circuit 53 of the transmitting station. It will thus be seen that by virtue of the provision of the fast and slow timing pulses in synchronizism with the fast and slow timing pulses of the transmitting station, the gated switch 197 actuated in response to the "fast white" signal 144, and the line and frame sweep counters and summing circuits 212, 214, 213, 216, 215, 214 the writing electron beam provided by the writing gun 204 of the display tube 199 is rectilinearly scanned over the storage screen 202 in the same stepped fashion and at the same scanning rate as the electron beam of the camera tube 31.

In order to provide the line and frame resetting pulses for the line and frame sweep counters 212, 214 in synchronizism with the resetting of the sweeps at the transmitting station, output circuits 177 and 178 of the slow-fast detector 174 and the black-white detector 175 are both connected to line synchronizing code recognition circuit 217 which has its output circuit 218 coupled to line sweep counter circuit 212. Line synchronizing code recognition circuit 217 provides line and frame resetting pulses for resetting the line sweep counter circuit 212 in response to the line and frame synchronizing signals 64 and 67 which are respectively added to the video signal, as above-described. Output circuit 218 of the line synchronizing code recognition circuit 217 is in turn coupled to the frame synchronizing core recognition circuit 219 which has its output circuit 220 coupled to the resetting circuit of frame sweep counter 214 for providing frame resetting pulses thereto in response to the frame synchronizing signal 67.

Figure 8:
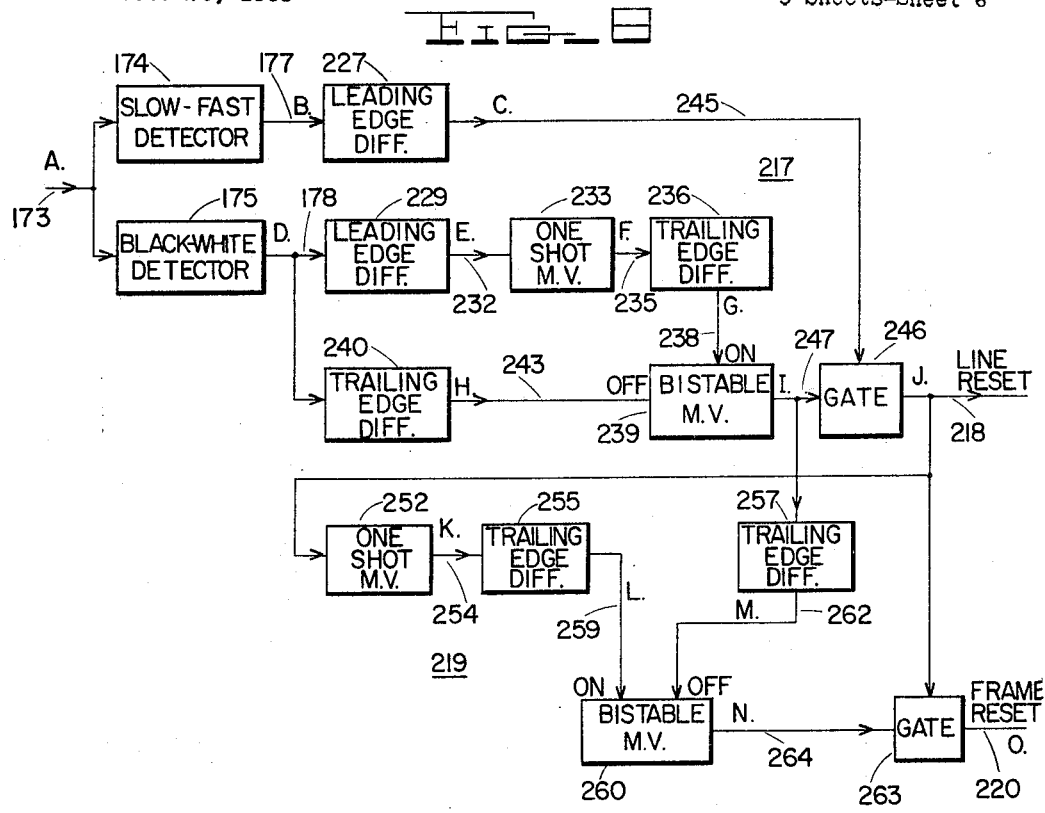
FIG. 8 is a schematic diagram further illustrating the line and frame synchronizing signal recognition circuitry of the receiving station.

Referring now additionally to FIG. 8 in which the components making up the line and frame synchronizing code recognition circuits 217 and 219 are diagrammatically shown in FIG. 10 in which the wave forms found in the component devices of FIG. 8 are shown, the mode of operation of the line and frame synchronizing code recognition circuits 217 and 219 will now be described. A recovered video signal in output circuit 173 from the squaring circuit 171 which may take the form shown in FIG. 10A, is applied to the slow-fast detector 174 and the black-white detector 175. FIG. 10A shows a recovered video signal having "black" levels 222–1, 222–2, 222–3, 222–4 and 222–5, a "white" level 223–1, a "fast white" level 224, a line synchronizing signal 64, a frame synchronizing signal 67, and another "white" level signal 223–2. Reference to FIGS. 10B and D, respectively, will reveal that a slow-fast detector 174 passes signals 225–1 in response to the "fast white" signal 224 of the recovered video signal 225–2 in response to the third or "fast white" level portion of the line synchronizing signal 64, and signals 225–3 and 225–4 respectively in response to the third or "fast white" level portions of the frame synchronizing signal 67, while the black-white detector 175 passes signals 226–1, 226–2, 226–3, 226–4 and 226–5 respectively in response to signals 223–1, 224, 64, 67, and 223–2 in the recovered video signal.

Slow-fast detector 174 has its output circuit 177 coupled to leading edge differentiating circuit 227 which differentiates the leading edges of the "fast white" signals 225 to provide sharp pulses 228–1, 228–2, 228–3, and 228–4, as shown in FIG. 10C. Black-white detector 175 has its output circuit 178 coupled to leading edge differentiating circuit 229 which differentiates the leading edges of the "white" and "fast white" signals 226 to provide sharp pulses 230–1, 230–2, 230–3, 230–4 and 230–5, as shown in FIG. 10E. The output circuit 232 of the leading edge differentiating circuit 229 is coupled to a conventional one-shot multivibrator or other conventional narrow-pulse generator 233 which provides narrow-pulses 234–1, 234–2, 234–3, 234–4, and 234–5 respectively in response to the differentiated pulses 230. The output circuit 235 of the one shot multivibrator 233 is coupled to trailing edge differentiating circuit 236 which differentiates the trailing edges of the pulses 234 to provide differentiated pulses 237–1, 237–2, 237–3, 237–4 and 237–5, as shown in FIG. 10G. Trailing edge differentiating circuit 236 has its output circuit 238 coupled to the turn "ON" circuit of bistable multivibrator 239.

Black-white detector 175 also has its output circuit 178 coupled to trailing edge differentiating circuit 240 which differentiates the trailing edges of the pulses 226 to provide differentiated pulses 242–1, 242–2, 242–3, 242–4 and 242–5, as shown in FIG. 10H. Trailing edge differentiating circuit 240 has its output circuit 243 coupled to the turn "OFF" input circuit of bistable multivibrator 239. It will now be seen that the differentiated pulses 237 appearing in the output circuit 238 of trailing edge differentiator 236 and the differentiated pulses 242 appearing in the output circuit 243 of trailing edge differentiating circuit 240 respectively turn bistable multivibrator 239 ON and OFF to provide pulses 244–1, 244–2, 244–3, 244–4, and 244–5, as shown in FIG. 10I. Output circuit 245 of leading edge differentiating circuit 227 is coupled to gate circuit 246 which has its gating signal input circuit coupled to output circuit 247 of bistable multivibrator 239. The narrow differentiated pulses 228 appearing at the output circuit 245 of leading edge differentiating circuit 227 are gated through gate 246 to output circuit 218, i.e., the line reset circuit, in the presence of the pulses 244 in the output circuit 247 of the bistable multivibrator 239. Thus, it is seen that differentiated pulse 228–2 responsive to the leading edge of the third level signal portion of line synchronizing signal 64 occurs during pulse 244–3, as indicated by the dashed line 248, and that differentiated pulses 228–3 and 228–4 responsive respectively to the leading edges of the third level signals of frame synchronizing signal 67 occur during pulse 244–4, as shown by dashed lines 249 and 250, and thus that the differentiated pulses 228–2, 228–3 and 228–4 are passed by gate 246 to the line sweep counter reset line 218, these pulses thus being the line reset pulses for the line sweep counter 212.

In order to provide the frame reset pulses, the output circuit 218 of the line synchronizing recognition circuit 217, i.e., gate 246 is coupled to a conventional one-shot multivibrator 252 which generates pulses 253–2, 253–3 and 253–4 respectively in response to the line reset pulses 228–2, 228–3 and 228–4. Output circuit 254 of one-shot multivibrator 252 is coupled to trailing edge differentiating circuit 255 which differentiates the trailing edges of the pulses 253 to provide narrow pulses 256–2, 256–3 and 256–4, as shown in FIG. 10L. Output circuit 247 of bistable multivibrator 239 is coupled to trailing edge differentiating circuit 257 which differentiates the trailing edges of pulses 244 to provide narrow pulses 258–1, 258–2, 258–3, 258–4 and 258–5 as shown in FIG. 10M. Output circuit 259 of trailing edge differentiating circuit 255 is coupled to the turn "ON" circuit of bistable multivibrator 260 and output circuit 262 of trailing edge differentiating circuit 257 is coupled to the turn "OFF" circuit of multivibrator 260. Inspection of FIGS. 10L, M, and N will now reveal that pulse 256-2 from trailing edge differentiating circuit 255 and pulse 258-3 from trailing edge differentiating circuit 257 will respectively turn multivibrator 60 ON and OFF to provide pulse 262-1 and that pulses 256-3 and 258-4 respectively turn multivibrator 260 ON and OFF to provide pulse 262-2. Output circuit 218 of gate circuit 246, i.e., the line reset pulse circuit, is coupled to gate circuit 263 which has its gating signal input circuit coupled to output circuit 264 of bistable multivibrator 260. Thus, the line reset pulses 228 are gated through to the frame reset pulse circuit 220 in the presence of pulses 262. It will now be seen that pulse 228-4 which is responsive to the leading edge of the second third level signal of frame resetting signal 67 occurs during pulse 262-2 from multivibrator 260 and is thus gated through to the frame reset pulse line 220, as shown in FIG. 10.

While the system illustrated in FIGS. 1 through 11, inclusive, and described above has been shown and described as providing a compression ratio of 4 to 1, it will be readily apparent that other compression ratios may be utilized in order to provide optimum compression dependent upon the type of data being compressed. Furthermore, while the system has been shown and described as compressing the "white" data, it will be readily apparent that the system may equally advantageously be employed for compressing "black" data.

It will be further readily be seen that the system of FIGS. 1 through 11 may be modified to compress both "white" and "black" data. This may be accomplished at the transmitting station by providing another NOR logic circuit 93 adapted to sense the simultaneous presence in the shift register 90 of four "black" signal bits, another pulse shaper 95 and another multivibrator 97. The additional "black" multivibrator 97 may have its output circuit coupled to the same gated switch 100 as the "white" multivibrator 97 shown in FIG. 2, and output circuit 104 of the 4 to 1 count-down circuit 103 may also be coupled to terminate the output signal of the "black" multivibrator 97. The output circuit of the additional "black" multivibrator will also be coupled to inhibit the additional "black" NOR logic circuit 93 and to mixer 92 to provide a fourth level "fast-black" signal. In such a system, the "slow-black" signal may be the reference level with "white" and "fast white" signals at successively higher levels as in the case of the system of FIGS. 1 through 11, and the "fast-black" signal would then be at a level lower than "slow-black."

At the receiving station, one additional video slicer would be required coupled to squaring circuit 171 and having its output circuit coupled to actuate gated switch 197 so as to pass the fast clock pulses to the write pulse generator 207 and line sweep counter 212 in response to a detected "fast-black" video signal.

It will be understood that certain types of documents and other data being transmitted may include substantial uninterrupted areas of background color so that it may be desirable to provide an even higher compression ratio for such areas. Referring now to FIG. 12 in which like elements are indicated by like reference numerals, there is shown diagrammatically a transmission system incorporating two compression systems in tandem resulting in a further reduction of redundant information and a corresponding saving of transmission time. In this system, two compression ratios of 8 to 1 and 4 to 1 are illustratively provided, it again being understood that other compression ratios may be provided. Master oscillator 265, which corresponds to master oscillator 39 of the embodiment of FIG. 2, in the illustrated embodiment provides fast clock pulses having a 40 kc. repetition rate, these pulses being counted-down by the 4 to 1 count-down circuit 266 to provide the 10 kc. timing pulses of the embodiment of FIG. 2, which in turn are counted-down by the 4 to 1 count-down circuit 40 to provide the 2.5 kc. slow timing pulses. Output circuit 45 of the 4 to 1 count-down circuit 40 and output circuit 44 of the 4 to 1 count-down circuit 266 are coupled to gated switch 46 which has its gating signal input circuit 47 coupled to the bistable multivibrator circuit 97, as in the case of the embodiment of FIG. 2. Output circuit 48 of gated switch 46 and output circuit 267 of master oscillator 265 are coupled to gated switch 268 which has its gating signal input circuit 269 coupled to the output circuit 270 of bistable multivibrator 272. Gated switch 268 in turn has its output circuit 273 coupled to line counter 49, the remaining circuitry of line and frame counters, line and frame synchronizing code logics, and line and sweep summing circuits being identical to that shown in FIG. 2. Likewise, output circuit 273 of gated switch 268 is coupled to video pulse generator 68 which in turn is coupled to electron gun 33 of camera tube 31 and to the gated switch 74, the target electrode 32 of camera tube 31 being coupled to video amplifier 72 which in turn is coupled to the gated switch 74 as aforesaid. The output of gated switch 74 is again coupled by integrating circuit 77 to video slicer 76.

Here, however, an additional twelve bit storage shift register circuit 274 is provided having its input coupled to video slicer 76 and having its shift circuits 275 coupled to the output circuit 273 of gated switch 268 so as to be shifted by the timing pulses passed thereby. Shift register 274 has its output coupled to the four bit shift register 85. NOR logics 276 are coupled to sense the simultaneous presence of twelve "white" signal bits in the twelve bit storage register 274 and to provide a signal in response thereto. Another NOR logic circuit 277 is provided coupled to the output circuits of NOR logic circuits 276 and 93 and providing an output signal in response to output signals from both of the logic circuits 276, 93, i.e., in response to the simultaneous presence of twelve "white" signal bits in shift register 274 and for "white" signal bits in shift register 85.

NOR logic circuit 277 has its output circuit coupled to pulse shaper 278 which in turn is coupled to the turn "ON" circuit of bistable multivibrator 272. The output circuit 270 of bistable multivibrator 272 is coupled to disable or inhibit NOR logic circuits 93 and 277, to the mixer 92 and to the gating signal input circuit 269 of gated switch 268. Output circuit 270 of bistable multivibrator 272 is further connected to gated switch 279 which is coupled to output circuit 273 of gated switch 268 to receive the timing pulses passed thereby. The output circuit 280 of gated switch 279 is coupled to 16 to 1 count-down circuit 282 which in turn has its output circuit 283 coupled to the turn "OFF" circuit of bistable multivibrator 272.

It will now be seen that the twelve bit register 274 will load-up first followed by loading of the four bit register 85, thus introducing a sixteen bit delay between scanning-off of the optical image exposed to camera tube 31 and transmission of the video signal, as opposed to the four bit delay provided in the system of FIG. 2. It will be understood that if a "black" signal bit is present in register 274, and a "black" signal bit also appears in register 85, neither NOR logic circuits 93, 276 will provide an output signal and therefor that the slowest clock pulses, i.e., 2.5 kc. in the illustrated embodiment, will be passed by gated switches 46 and 268. Further, if twelve "white" signal bits should simultaneously appear in register 274 while one "black" signal bit is present in register 93, while logic circuit 276 will provide an output signal, no output signal will be provided by either logic circuit 93 or 276, and thus again, the slowest clock pulses will be passed.

If, however, four "white" signal pulses simultaneously appear in register 85 while one or more "black" signal bits are present in register 274, logic circuit 93 will provide an output signal to turn on bistable multivibrator 97 thus to initiate a control pulse 138, as above described, in turn to actuate gated switch 46 to pass the intermediate rate clock pulses, i.e., 10 kc. in the illustrated embodiment, this control pulse 138 be terminated in response to four of the intermediate rate clock pulses connected by count-down circuit 103. The control pulse 138 from bistable multivibrator 97 is applied to mixer 92 and added to the video signal therein to provide an intermediate or "fast white" level signal.

It will now be seen that if twelve "white" signal bits simultaneously appear in register 274, and four "white" signal bits also simultaneously appear in register 85, i.e., a total of sixteen "white" signal bits simultaneously appear, both NOR logics circuits 93, 276 will provide output signals and NOR logic circuit 277 will thus provide an output signal which will turn on bistable multivibrator 272 to provide another control signal. This other control signal is applied to inhibit NOR logic circuits 93 and 277, and actuates gated switch 268 to pass the fastest clock pulses, i.e., 40 kc. in the illustrated example. The other control signal from bistable multivibrator 272 also actuates gated switch 279 to pass the fastest clock pulses to the 16 to 1 count-down circuit 282 which thus terminates the other control signal at the end of sixteen of the fastest clock pulses; it will be observed that sixteen of the fastest clock pulses occur during the same interval as one of the slowest clock pulses and four of the intermediate clock pulses and thus that the other control pulse has the same duration as the control pulse 138. This other control pulse is also applied to mixer 92 being added thereby to control pulse 138 and the "white" video signal to provide a fourth level "super fast white" level video signal still higher than the "fast white" level video signal.

During the duration of the other control pulse provided by bistable multivibrator 272, the sixteen "white" signal bits stored in registers 274 and 85 are shifted out of mixer 92 by the fastest clock pulses as a single "white" signal, and sixteen new video signal bits are at the same time shifted into the registers at the fastest rate. At the end of the other control pulse, the inhibits on NOR logic circuits 93 and 277 are removed and a new sensing of the levels of the signal bits now stored in the registers 85, 274 occurs.

It will thus be readily seen that in the embodiment of FIG. 12, the intermediate scanning rate and third level video signal are provided in response to the successive occurrence of four "white" video signals and that the fastest scanning rate and fourth level video signal are provided in response to the successive occurrence of sixteen "white" video signal bits. It will further be readily apparent that the receiving system shown in FIG. 7 may be readily modified to accommodate the fourth level video signal and three scanning rates by the addition of another detector coupled to the demodulator 145 to detect the presence of the fourth level video signal and to provide a control signal in response thereto, a 40 kc. oscillator and additional 4 to 1 count-down circuit corresponding to oscillator 265 and count-down circuit 266 of the transmitting station, and one additional gated switch in order selectively to couple the slow, intermediate, or fast timing pulses to the writing pulse generator 207 and to the line and frame sweep counter circuitry.

While we have described above the principles of our invention in connection with specific apparatus, it is to be clearly understood that this description is made only by way of example and not as a limitation to the scope of our invention.

What is claimed is:

1. A television system for transmitting a picture comprising: camera tube means having means for converting an optical image into a corresponding electrical characteristic pattern and rectilinear scanning means for converting said pattern into a time-based video signal variable between first and second levels respectively; sweep voltage generating means coupled to said scanning means; first and second sweep timing means respectively having relatively slow and fast rates; means for selectively coupling said timing means to said sweep voltage generating means for actuating the same at said slow and fast rates, respectively; means for modulating a carrier signal with said video signal to provide a transmission signal; means for sensing the level of said video signal and for providing a control signal in response to a predetermined amount of redundant video signal information of a predetermined one of said first and second levels; means coupling said sensing means to said selective coupling means for actuating the same in response to said control signal to couple said second sweep timing means to said sweep voltage generating means; means for providing an indicating signal in said video signal in response to said control signal; means for demodulating said transmission signal to recover said video signal; means for separating said indicating signal from said recovered video signal and for providing another control signal in response thereto; signal-to-image converting means coupled to said demodulating means and including another rectilinear scanning means for converting said recovered video signal into a optical image; another sweep voltage generating means coupled to said other scanning means; third and fourth sweep timing means respectively having said slow and fast rates; another means for selectively coupling said third and fourth timing means to said other sweep voltage generating means for actuating the same at said slow and fast rates, respectively; and means coupling said separating means to said other selective coupling means for actuating the same in response to said other control signal to couple said fourth sweep timing means to said other sweep voltage generating means.

2. The system of claim 1 wherein said means for providing an indicating signal includes mixing means for adding said control signal to said video signal thereby to provide said indicating signal at a third level of said video signal higher than said first and second levels with respect to a reference potential level.

3. A television system for transmitting a picture generally formed of two contrasting color levels comprising: camera tube means having means for converting an optical image into a corresponding electrical characteristic pattern, said converting means including means for generating an electron beam, a signal output circuit, and first means for rectilinearly scanning said electron beam for converting said pattern into a time-based video signal in said output circuit having first lower and second higher levels with respect to a reference level respectively in response to said color levels; first sweep voltage generating means coupled to said first scanning means; first means for generating slow clock pulses and second means for generating fast clock pulses having a repetition rate which is a multiple of the rate of said slow clock pulses; first selectively actuable switching means for selectively coupling said first and second clock pulse generating means to said first sweep voltage generating means for actuating the same in response to said slow and fast clock pulses, respectively, thereby selectively to provide slow and fast scanning rates; means for modulating a carrier signal with said video signal to provide a transmission signal; means coupled to said output circuit and to said first switching means for sensing the occurrence of said video signal having a predetermined number of the respective clock pulses and for providing a control signal in response thereto; means coupling said sensing means to said first switching means for actuating the same in response to said control signal to couple said second pulse generating means coupling said sensing means to said output circuit for providing an indicating signal in said video signal in response to sad control signal, means for demodulating said transmission signal to recover the video signal; means coupled to said demodulating means for separating said indicating signal from said recovered video signal and for providing another control signal in response thereto;

signal-to-image converting means coupled to said demodulating means including means for generating a second electron beam and second means for rectilinearly scanning the same thereby to convert said recovered video signal into an optical image; second sweep voltage generating means coupled to said second scanning means; third means for generating slow clock pulses and fourth means for generating fast clock pulses respectively having the same repetition rates as said first-named slow and fast clock pulses; second selectively actuable switching means for selectively coupling said third and fourth pulse generating means to said second sweep voltage generating means for actuating the same in response to said last-named slow and fast clock pulses, respectively, thereby selectively to provide slow and fast scanning rates; and means coupling said separating means to said second switching means for actuating the same in response to said other control signal thereby to couple said fourth clock pulse generating means to said second sweep voltage generating means to provide said fast scanning rate.

4. The system of claim 3 further comprising means for continuously synchronizing said third and fourth pulse generating means with said first and second pulse generating means, respectively.

5. The system of claim 3 wherein each of said sweep voltage generating means comprises clock pulse counting means and summing means for respectively providing stepped sweep voltages.

6. The system of claim 3 wherein said second video signal level is responsive to a background color in said image, and further comprising means in said output circuit for providing said first and second level video signals with predetermined fixed levels, respectively.

7. The system of claim 3 further comprising means coupled to said first switching means and to said camera tube means for dividing said video signal into increments corresponding to the respective slow and fast clock pulses.

8. The system of claim 7 wherein said dividing means comprises storage shift register means coupled to said output circuit and having means for storing a predetermined number of said video signal increments, and means coupling said first-named switching means to said shift register means for shifting the same by the respective clock pulses, and wherein said sensing means comprises means for interrogating said storage register means to sense the presence of said predetermined number of said video signal increments of said one level therein and to provide said control signal in response thereto.

9. The system of claim 3 wherein said first clock pulse generating means is coupled to said modulating means for supplying said carrier signal thereto.

10. The system of claim 3 further comprising means respectively coupling said first switching means to said camera tube means and said second switching means to said signal-to-image converting means for pulsing the respective electron beams on and off at the repetition rates of the respective slow and fast pulses.

11. A television system for transmitting a picture substantially formed of two contrasting color levels comprising: camera tube means having means for converting an optical image into a corresponding electrical characteristic pattern, and scanning means for converting said pattern into a time-based video signal having first and second levels respectively in response to said color levels; sweep generating means for selectively actuating said scanning means at slow and fast rates, respectively; means for selectively pulsing said video signal on and off at slow and fast rates, respectively, thereby to provide video signal bits having slow and fast repetition rates respectively; means for sampling said video signal bits to sense the occurrence of a predetermined successive number of said bits of one of said levels and for providing a control signal in response thereto; means coupled to said sweep generating means and to said pulsing means for respectively actuating the same to provide said fast scanning and pulse rates, respectively, in response to said control signal; means for providing an indicating signal component in said video signal in response to said control signal; means for modulating a carrier signal with said video signal to provide a transmission signal; means for demodulating said transmission signal to recover said video signal; means for separating said indicating signal from said recovered video signal and for providing another control signal in response thereto; signal-to-image converting means including another scanning means for converting said recovered video signal into an optical image; another sweep generating means for selectively actuating said other scanning means at said first-named slow and fast rates, respectively; and means for actuating said other sweep generating means to provide said fast scanning rate in response to said other control signal.

12. A television system for transmitting a picture substantially formed of two contrasting color levels comprising: camera tube means including target electrode means for converting an optical image exposed thereto into a corresponding electrical characteristic pattern, an output circuit coupled to said target electrode, means for generating an electron beam and for directing the same onto said target electrode, and means for rectilinearly scanning said electron beam over said target electrode thereby to convert said pattern into a time-based video signal in said output circuit having first lower and second higher levels with respect to a reference potential level respectively in response to said color levels, said higher level being responsive to background color in said optical image; first means for generating fast clock pulses having a predetermined repetition rate; second means coupled to said first pulse generating means for generating slow clock pulses in response to said fast clock pulses and having a repetition rate which is a fraction of the rate of said fast clock pulses; first pulse counting means for counting said clock pulses and including means for providing first count-indicating pulses and means for providing resetting pulses for resetting the same in response to a predetermined pulse count; second pulse counting means coupled to said first pulse counting means for counting said resetting pulses and including means for providing second count-indicating pulses and means for providing resetting pulses for resetting the same in response to a predetermined pulse count; first summing means coupling said first pulse counting means to said scanning means for summing said first count-indicating pulses to provide a stepped line sweep voltage; second summing means coupling said second pulse counting means to said scanning means for summing said second count-indicating pulses to provide a stepped frame sweep voltage; first selectively actuable switching means for selectively coupling said first and second pulse generating means to said first pulse counting means thereby selectively to provide fast and slow scanning rates; means coupled to said first switching means for generating trigger pulses in response to the respective clock pulses; means coupling said trigger pulse generating means to said electron beam generating means for pulsing said electron beam on and off at the repetition frequency of the respective clock pulses thereby to provide video signal bits having said fast and slow repetition rates, respectively; means coupled to said output circuit for integrating said video signal bits; means coupled to said integrating means for providing said first and second level signals with predetermined fixed levels, respectively, storage shift register means coupled to said clamping means and having means for storing a predetermined number of said integrated video signal bits, said first switching means being coupled to said shift register means for supplying the respective clock pulses thereto thereby to shift the same; means for interrogating said shift register means to sense the presence of said predetermined number of intergrated video signal bits of said second level therein and to provide a control signal in response thereto; means coupled to said interrogating means for generating a control pulse in response to said control signal; means coupling said control pulse generating means to said first switching means for actuating the same in response to said control pulse to couple said first pulse generating means to said first pulse counting means thereby to provide said fast scanning rate during said control pulse; said control pulse generating means being coupled to said interrogating means for inhibiting the same during said control pulse; pulse counting means coupling said first switching means and said control pulse generating means for terminating said control pulse in response to a predetermined number of said fast clock pulses equal in number to the bit storage of said shift register means whereby each said predetermined number of integrated video signal bits of said second level are shifted out of said shift register means by said fast clock pulses as a single video signal of said one level and having the duration of said predetermined number of fast clock pulses prior to a new interrogation of said shift register means; means for amplitude modulating said integrated video signal bits onto a carrier to provide a transmission signal; mixing means coupling said shift register means to said modulating means for supplying said integrated video signal bits thereto, said mixing means being coupled to said control pulse generating means for adding said control pulse to said single video signal thereby to provide a third video signal level higher than said first and second levels; means for demodulating said transmission signal to recover the video signal therein; means coupled to said demodulator means for detecting said third video signal level and for providing another control signal in response thereto; signal-to-image converting means coupled to said demodulating means including another rectilinear scanning means for converting the recovered video signal into an optical image; sweep voltage generating means coupled to said other scanning means; third and fourth means for respectively generating other fast and slow clock pulses respectively having the same repetition rates as said first-named fast and slow clock pulses; second selectively actuable switching means for selectively coupling said third and fourth pulse generating means to said sweep voltage generating means for actuating the same in response to said other fast and slow clock pulses, respectively, thereby to provide fast and slow scanning rates; and means coupling said detecting means to said second switching means for actuating the same in response to said other control signal thereby to couple said third pulse generating means to said sweep voltage generating means.

13. The system of claim 12 further comprising first means coupled to said first pulse counting means for generating a stepped pulse in response to each said resetting pulse thereof, said first stepped pulse generating means being coupled to said mixing means for adding said stepped pulse to the video signal from said shift register means thereby to provide a line synchronizing signal formed of a signal of said second level followed by a signal of said third level; second means coupled to said second pulse counting means for generating two stepped pulses in succession in response to each said resetting pulse thereof; said second stepped pulse generating means being coupled to said mixing means for adding said two stepped pulses to the video signal from said shift register means thereby to provide a frame synchronizing signal formed of two of said line synchronizing signals in succession; means coupled to said demodulating means for respectively detecting said line and frame synchronizing signals; and means coupling said last-named detecting means to said sweep voltage generating means for resetting the same in response to said line and frame synchronizing signals, respectively.

14. A television system for transmitting a picture generally formed of two contrasting color levels comprising: camera tube means having means for converting an optical image into a corresponding electrical characteristic pattern, said converting means including means for generating an electron beam, a signal output circuit, and first means for rectilinearly scanning said electron beam for converting said pattern into a time-based video signal in said output circuit having first lower and second higher levels with respect to a reference level respectively in response to said color levels; first sweep voltage generating means coupled to said first scanning means; first means for generating slow clock pulses and second means for generating fast clock pulses having a repetition rate which is a multiple of the rate of said slow clock pulses; first selectively actuable switching means for selectively coupling said first and second clock pulse generating means to said first sweep voltage generating means for actuating the same in response to said slow and fast clock pulses, respectively, thereby selectively to provide slow and fast scanning rates; means for modulating a carrier signal with said video signal to provide a transmission signal; storage shift register means for supplying said video signal to said modulating means and having means for storing a predetermined number of video signal bits; means for coupling the selected clock pulses to said shift register means for shifting the same whereby said video signal is shifted through said shift register means by said slow and fast clock pulses, respectively; means for simultaneously sensing the amplitudes of the video signal bits respectively stored in said storing means and for providing a control signal in response to all of the stored video signal bits simultaneously having a predetermined one of said levels; means for actuating said switching means in response to said control signal thereby to couple said fast clock pulses to said sweep voltage generating means and to said shift register means; means for inhibiting said sensing means in response to said control signal; means for terminating said control signal in response to a number of said fast clock pulses equal to the bit storage of said shift register means whereby said video signal bits of said one level are shifted out of said shift register means to said modulating means by said fast clock pulses prior to a new sensing of the amplitudes of the video signal bits in said shift register means; means for providing a video signal having a third level higher than said first and second levels with respect to a reference potential and for applying the same to said modulating means in response to and during said control signal; means for demodulating said transmission signal to recover the video signal; means for detecting said third level video signal and for providing another control signal in response thereto; signal-to-image converting means coupled to said demodulating means including means for providing another electron beam and another means for rectilinearly scanning the same thereby to convert said recovered video signal into an optical image; another sweep voltage generating means coupled to said other scanning means; third means for generating slow clock pulses and fourth means for generating fast clock pulses respectively having the same repetition rates as said first-named slow and fast clock pulses; another selectively actuable switching means for selectively coupling said third and fourth pulse generating means to said other sweep voltage generating means for actuating the same in response to said last-named slow and fast clock pulses, respectively, thereby selectively to provide slow and fast scanning rates; and means for actuating said other switching means in response to said other control signal thereby to couple said fourth pulse generating means to said other sweep voltage generating means to provide said fast scanning rate.

15. The system of claim 14 wherein said sensing means includes NOR circuit means respectively coupled to said bit storage means.

16. A television system for transmitting a picture generally formed of two contrasting color levels comprising: camera tube means having means for converting an optical image into a corresponding electrical characteristic pattern, said converting means including means for generating an electron beam, a signal output circuit, and first means for rectilinearly scanning said electron beam for converting said pattern into a time-based video signal in said output circuit having first lower and second higher levels with respect to a reference level respectively in response to said color levels; first sweep voltage generating means coupled to said first scanning means; first means for generating slow clock pulses and second means for generating fast clock pulses having a repetition rate which is a multiple of the rate of said slow clock pulses; first selectively actuable switching means for selectively coupling said first and second clock pulse generating means to said first sweep voltage generating means for actuating the same in response to said slow and fast clock pulses, respectively, thereby selectively to provide slow and fast scanning rates; means coupled to said output circuit and to said first switching means for sensing the presence of said video signal having said second level during a predetermined number of the respective clock pulses and for providing a control signal in response thereto; means coupling said sensing means to said first switching means for actuating the same in response to said control signal thereby to couple said second pulse generating means to said sweep voltage generating means; means coupled to said sensing means for modifying said video signal in response to and during said control signal to provide said video signal with a third level higher than said first and second levels; means for modulating a carrier signal with said video signal to provide a transmission signal; means for demodulating said transmission signal to recover the video signal contained therein; first means coupled to said demodulating means for detecting said third level video signal and for providing another control signal in response thereto; second means coupled to said demodulating means for detecting said second and third level video signals; direct viewing cathode ray tube means coupled to said second detecting means and including means for generating a second electron beam and another means for rectilinearly scanning the same thereby to convert said second and third level video signals into a corresponding optical image, second sweep voltage generating means coupled to said other scanning means; third means for generating slow clock pulses and fourth means for generating fast clock pulses; means for synchronizing said third and fourth clock pulse generating means, respectively; second means for selectively coupling said third and fourth clock pulse generating means to said second sweep voltage generating means for actuating the same in response to said last-named slow and fast clock pulses respectively thereby selectively to provide slow and fast scanning rates for said cathode ray tube means; and means coupling said first detecting means to said second switching means for actuating the same in response to said other control signal thereby to couple said fourth clock pulse generating means to said second sweep voltage generating means to provide said fast scanning rate.

17. The system of claim 16 wherein said fourth clock pulse generating means includes means for generating fast clock pulses having a predetermined repetition rate and said third clock pulse generating means is coupled to said fourth clock pulse generating means for generating said third clock pulses in response to said fourth clock pulses; wherein said first clock pulse generating means is coupled to said modulating means for supplying said slow clock pulses thereto for said carrier signal; and wherein said synchronizing means comprises means for comparing the carrier frequency of said transmission signal with the frequency of said slow clock pulses from said third clock pulse generating means, and means for regulating the repetition frequency of said fourth clock pulse generating means in response to said comparison.

18. The system of claim 16 further comprising writing pulse generating means coupled to said second switching means for generating writing pulses in response to said slow and fast clock pulses, respectively; and third selectively actuable switching means coupling said writing pulse generating means to said second electron beam generating means for pulsing said second electron beam on and off in response to said writing pulses, said second detecting means being coupled to said third switching means for actuating the same in response to said second and third level video signals thereby to couple said writing pulse generating means to said second electron beam generating means.

19. The system of claim 16 wherein each of said first and second sweep voltage generating means comprises first pulse counting means coupled to the respective switching means, first pulse summing means coupling the respective first pulse counting means to the respective scanning means for respectively providing a stepped line sweep voltage, second pulse counting means coupled to the respective first pulse counting means, and second pulse summing means coupling the respective second pulse counting means to the respective scannning means for generating a stepped frame sweep voltage; and further comprising first means coupled to the first pulse counting means of said first sweep voltage generating means for generating a stepped pulse in response to a predetermined number of the respective clock pulses, means coupling said first stepped pulse generating means to said video signal modifying means thereby to provide a line synchronizing signal in said video signal formed by a signal of said second level followed by a signal of said third level, second means coupled to said second pulse counting means of said first sweep voltage generating means for generating two successive stepped pulses in response to a predetermined number of pulses counted by said second pulse counting means, means coupling said second stepped pulse generating means to said video signal modifying means thereby to provide a frame synchronizing signal in said video signal formed by two of said line synchronizing signals in succession, third means coupled to said first and second detecting means for detecting said line and frame synchronizing signals, means coupling said third detecting means to said first pulse counting means of said second sweep voltage generating means for resetting the same in response to said detected line and frame synchronizing signals, fourth means coupled to said third detecting means for detecting said frame synchronizing signals, and means coupling said fourth detecting means to said second pulse counting means of said second sweep voltage generating means or resetting the same in response to said detected frame synchronizing signals.

20. A television system for transmitting a picture generally formed of two contrasting color levels comprising: camera tube means having means for converting an optical image into a corresponding electrical characteristic pattern, said converting means including means for generating an electron beam, a signal output circuit, and first means for rectilinearly scanning said electron beam for converting said pattern into a time-based video signal in said output circuit having first lower and second higher levels with respect to a reference level respectively in response to said color levels; first means for generating first slow clock pulses and second means for generating first fast clock pulses having a repetition rate which is a multiple of the rate of said slow clock pulses; first means for counting said first clock pulses including means for resetting the same in response to a predetermined number of pulses counted thereby; first pulse summing means coupling said first pulse counting means to said first scanning means for providing a stepped line sweep voltage; second pulse counting means coupled to said first pulse counting means and including means for resetting the same in response to a predetermined number of pulses counted thereby; second pulse summing means coupling said second pulse counting means to said first scanning means for providing a stepped frame sweep voltage; first selectively actuable switching means for selectively coupling said first and second clock pulse generating means to said first pulse counting means thereby selectively to provide fast and slow scanning rates; means coupled to said output circuit and to said first switching means for sensing the presence of said video signal having said second level during a predetermined number of the respective clock pulses and providing a control signal in response thereto; means coupling said sensing means to said first switching means for actuating the same in response to said control signal thereby to couple said second pulse generating means to said first pulse counting means to provide said fast scanning rate; means for adding said control signal to said video signal to provide said video signal with a third level higher than said first and second levels; first means coupled to said first pulse counting means for generating a stepped pulse in response to said predetermined number of the respective clock pulses counted thereby; means coupling said first stepped pulse generating means to said adding means for adding said stepped pulse to said video signal thereby to provide a line synchronizing signal in said video signal formed by a signal of said second level followed by a signal of said third level; second means coupled to said second pulse counting means for generating two succesive stepped pulses in response to said predetermined number of pulses counted thereby; means coupling said second stepped pulse generating means to said adding means for adding said two stepped pulses to said video signal thereby to provide a frame synchronizing signal in said video signal formed by two of said line synchronizing signals in succession; means coupled to said adding means for amplitude modulating said video signal onto a carrier signal to provide a transmission signal, said first clock pulse generating means being coupled to said modulating means for supplying said slow clock pulses thereto as said carrier signal; means for transmitting said transmission signal and for receiving the same at a remote location; means coupled to said receiving means for demodulating said transmission signal to recover the video signal contained therein; first means coupled to said demodulating means for detecting said third level video signal and for providing a second control signal in response thereto; second means coupled to said demodulating means for detecting said second and third level video signals; direct viewing cathode ray tube means including means for generating a second electron beam and second means for rectilinearly scanning the same thereby to convert a video signal into a corresponding optical image; third means for generating second fast clock pulses having the same repetition rate as said first fast clock pulses; fourth means coupled to said third clock pulse generating means for generating second slow clock pulses having the same repetition rate as said first clock pulses; third means coupled to said receiving means for detecting the carrier signal component of said transmission signal; phase detector means coupled to said third detecting means and to said fourth clock pulse generator means for comparing the phase of said carrier signal and said second slow clock pulses and providing an error signal in response to deviation thereof; means coupling said phase detector means to said third clock pulse generator means for varying the repetition frequency of said second fast clock pulses in response to said error signal; third means for counting said second clock pulses; third pulse summing means coupling said third pulse counting means to said second scanning means for providing a stepped line sweep voltage; fourth pulse counting means coupled to said third pulse counting means; fourth pulse summing means coupling said fourth pulse counting means to said second scanning means for providing a stepped frame sweep voltage; second selectively actuable switching means for selectively coupling said third and fourth clock pulse generating means to said third pulse counting means thereby selectively to provide fast and slow scanning rates for said cathode ray tube means; means coupling said first detecting means to said second switching means for actuating the same in response to said second control signal thereby to couple said third clock pulse generating means to said third pulse counting means to provide said fast scanning rate; writing pulse generating means coupled to said second switching means for generating writing pulses in response to said second slow and fast clock pulses, respectively; third selectively actuable switching means coupling said writing pulse generating means to said second electron beam generating means for pulsing said second electron beam on and off in response to said writing pulses, said second detecting means being coupled to said third switching means for actuating the same in response to said second and third level video signals thereby to couple said writing pulse generating means to said second electron beam generating means; fourth means coupled to said first and second detecting means for detecting both said line and frame synchronizing signals; first means coupling said fourth detecting means to said third pulse counting means for resetting the same in response to said detected line and frame synchronizing signals; fifth means coupled to said fourth detecting means for detecting said frame synchronizing signals; and second means coupling said fifth detecting means to said fourth pulse counting means for resetting the same in response to said detected frame synchronizing signals.

21. The system of claim 20 wherein said first detecting means comprises means for providing said second control signal with an upper level in response to said third level video signal and a lower level in response to said first and second level video signals, and wherein said second detecting means comprises means for providing an output signal for actuating said third switching means and having an upper level in response to both said second and third video signal levels and a lower level in response to said first level video signal.

22. The system of claim 21 wherein said fourth detecting means comprises first means coupled to said second detecting means for generating first narrow pulses in response to the leading edges of said upper levels of said control signal, respectively, first gate means coupled to said first narrow pulse generating means and to said first detecting means for passing said first narrow pulses in response to said upper levels of said output signal, respectively, thereby providing first reset pulses in response to both said line and frame synchronizing signals, respectively; and wherein said fifth detecting means comprises second means for generating second pulses having a predetermined width in response to said first reset pulses, third means for generating third narrow pulses in response to the trailing edges of said second pulses respectively, fourth means for generating fourth narrow pulses in response to the trailing edges of said upper levels of said output signal, respectively, fourth means for generating fourth pulses in response to said third narrow pulses and for terminating the same in response to said fourth narrow pulses, respectively, and second gate means coupled to said first gate means and to said fourth pulse generating means for passing said first reset pulses in response to said fourth pulses, respectively, thereby providing second reset pulses in response to said frame synchronizing signals, respectively.

References Cited by the Examiner

UNITED STATES PATENTS

| | | | |
|---|---|---|---|
| 2,965,709 | 12/1960 | Cherry et al. | 178—6.8 |
| 3,204,026 | 8/1965 | Doundoulakis | 178—6.8 |
| 3,229,033 | 1/1966 | Artzt | 178—6 |

DAVID G. REDINBAUGH, *Primary Examiner.*

JOHN W. CALDWELL, *Examiner.*

R. L. RICHARDSON, *Assistant Examiner.*